(12) United States Patent
Yu et al.

(10) Patent No.: US 11,126,827 B2
(45) Date of Patent: Sep. 21, 2021

(54) METHOD AND SYSTEM FOR IMAGE IDENTIFICATION

(71) Applicant: Alibaba Group Holding Limited, George Town (KY)

(72) Inventors: Kun Yu, Hangzhou (CN); Yan Wang, Beijing (CN)

(73) Assignee: Alibaba Group Holding Limited

( * ) Notice: Subject to any disclaimer, the term of this patent is extended or adjusted under 35 U.S.C. 154(b) by 24 days.

(21) Appl. No.: 16/423,741

(22) Filed: May 28, 2019

(65) Prior Publication Data
US 2019/0347472 A1 Nov. 14, 2019

Related U.S. Application Data

(63) Continuation-in-part of application No. PCT/CN2017/112071, filed on Nov. 21, 2017.

(30) Foreign Application Priority Data

Nov. 30, 2016 (CN) .......................... 201611090126.8

(51) Int. Cl.
*G06K 9/00* (2006.01)
*G06K 9/62* (2006.01)

(52) U.S. Cl.
CPC ..... *G06K 9/00288* (2013.01); *G06K 9/00255* (2013.01); *G06K 9/00261* (2013.01); *G06K 9/6257* (2013.01)

(58) Field of Classification Search
CPC ............................ G06F 16/00; G06K 9/00255; G06K 9/00261; G06K 9/00268; G06K 9/00288; G06K 9/6215; G06K 9/6257
See application file for complete search history.

(56) References Cited

U.S. PATENT DOCUMENTS

| 7,043,474 | B2 | 5/2006 | Mojsilovic | |
|---|---|---|---|---|
| 7,697,792 | B2 | 4/2010 | Keating | |
| 7,876,949 | B1 | 1/2011 | Oakes, III | |
| 9,129,148 | B1* | 9/2015 | Li | G06K 9/52 |
| 2008/0212899 | A1 | 9/2008 | Gokturk | |
| 2015/0235073 | A1* | 8/2015 | Hua | G06K 9/00281 |
| | | | | 382/118 |

FOREIGN PATENT DOCUMENTS

| CN | 102646190 | 8/2012 |
|---|---|---|
| CN | 104850600 | 8/2015 |
| CN | 104866826 | 8/2015 |
| CN | 104992146 | 10/2015 |
| CN | 105023006 | 11/2015 |

(Continued)

OTHER PUBLICATIONS

Xiaosheng et al. "A KNN-Based Model for Automatic Image Categorization [J]." Journal of Library Science in China, vol. 33, No. 167, Jan. 2007, pp. 74-76.

*Primary Examiner* — Manuchehr Rahmjoo
(74) *Attorney, Agent, or Firm* — Van Pelt, Yi & James LLP

(57) ABSTRACT

Image identification is disclosed including acquiring N images, N being a natural number greater than 1, extracting target characteristic information from respective ones of the N images to obtain a first data set corresponding to the N images, and determining, using a data model, a category associated with the first data set corresponding to the N images.

10 Claims, 25 Drawing Sheets

(56) References Cited

FOREIGN PATENT DOCUMENTS

| | | |
|---|---|---|
| CN | 105138886 | 12/2015 |
| CN | 105141615 | 12/2015 |
| CN | 105302812 | 2/2016 |
| CN | 105320954 | 2/2016 |
| CN | 105404863 | 3/2016 |
| CN | 105740426 | 7/2016 |
| CN | 105893920 | 8/2016 |

* cited by examiner

400

1400

1500

1600

1700

1800

2000

2300

METHOD AND SYSTEM FOR IMAGE IDENTIFICATION

CROSS REFERENCE TO OTHER APPLICATIONS

This application is a continuation-in-part of and claims priority to International (PCT) Application No. PCT/CN2017/112071, entitled IMAGE-BASED DETERMINATION METHOD AND APPARATUS, AND CALCULATION DEVICE filed on Nov. 21, 2017 which is incorporated herein by reference in its entirety for all purposes, which claims priority to China Patent Application No. 201611090126.8, entitled A PICTURE-BASED JUDGING METHOD AND MEANS AND A COMPUTING DEVICE, filed on Nov. 30, 2016 which is incorporated by reference in its entirety for all purposes.

FIELD OF THE INVENTION

The present invention relates to a method and a system for image identification.

BACKGROUND OF THE INVENTION

In the present application, image recognition refers to a recognition technology that performs identifications based on uploaded images. Identification is also called "identity verification" or "identity authentication" and refers to the process whereby the identities of operators are confirmed in a computer or computer network systems. Typically, when determining whether any N uploaded images are images of the same object (e.g., a natural person), makes a final determination based on the results of all of the comparisons. At least N−1 comparisons are performed to find that the corresponding two images are images of the same person before a final determination can be made that the N images are of the same person. In other words, the process of establishing whether the N images are of the same person involves making determinations using separate pairwise comparisons to determine image similarity. The final result is decided by voting on the determination results of all pairwise comparisons. All of the pairwise comparison decisions are independent.

Various business operations perform manual selection of pairwise comparison determination conditions to obtain pairwise comparison determination results. In the event that the scope of pairwise comparisons is not specified, N images require manual selection of N(N−1)/2 pairwise comparison determination conditions. In the event that the scope of the pairwise comparisons is specified, N images require manual selection of N−1 pairwise comparison determination conditions. However, an additional need to evaluate how to define the scope of pairwise comparisons is required. The above processes require a large amount of manual or semi-automated support. Fluctuations in pairwise comparison determination results directly affect the final voting result. Therefore, using multiple determination result voting as the final result is highly sensitive to the selection of pairwise comparison determination conditions. The selection of multiple determination conditions increases the maintenance costs of business operations. In addition, multiple determination conditions makes it difficult for the service personnel to directly/visually grasp whether a sequence of images is of the same person.

SUMMARY OF THE INVENTION

The present invention discloses a process and a system for image identification to reduce poor consistency in image determination results due to manual selection of multiple determination conditions for comparing images.

In some embodiments, a process for image identification is provided. The process comprises: acquiring N images, wherein N is a natural number greater than 1; extracting target characteristic information from each image to obtain a first data set corresponding to the N images; and determining a category associated with a first data set corresponding to the N images based on a data model, wherein the category indicates whether targets in the N images corresponding to the data set belong to the same object; wherein the data model is a model trained using multiple training sets. The multiple training sets can include data sets generated from target characteristic information in a group of images of the same object.

In some embodiments, the determining of the category associated with the first data set corresponding to the N images based on the data model comprises: obtaining, using the first data set, a first similarity value corresponding to the first data set, wherein the first similarity value indicates a probability that the N images corresponding to the first data set belong to the same object; acquiring positional relationships of the first similarity value in the data model, wherein the positional relationships are positional relationships between the first similarity value and similarity values corresponding to the multiple training sets; and determining a category associated with the first data set based on the positional relationships.

In some embodiments, the obtaining of the first similarity value corresponding to the first data set comprises: associating target characteristic information extracted from the N images to obtain a multidimensional vector; and obtaining the first similarity value based on the multidimensional vector.

In some embodiments, the obtaining of the first similarity value based on the multidimensional vector comprises: acquiring weights corresponding to each dimension of the multidimensional vector; and obtaining, based on the weights corresponding to each dimension, the first similarity value by subjecting the multidimensional vector to weighted sum.

In some embodiments, the obtaining of the first similarity value corresponding to the first data set comprises: conducting pairwise comparisons on the target characteristic information extracted from N images to obtain N(N−1)/2 similarity values; associating the N(N−1)/2 similarity values to obtain a vector of N(N−1)/2 dimensions; and obtaining the first similarity value based on the vector of N(N−1)/2 dimensions.

In some embodiments, the obtaining of the first similarity value based on the vector of N(N−1)/2 dimensions comprises: acquiring weights corresponding to each dimension of the vector of N(N−1)/2 dimensions; and obtaining, based on the weights corresponding to each dimension, the first similarity value by subjecting the vector of N(N−1)/2 dimensions to weighted sum.

In some embodiments, the multiple training sets further comprise: data sets generated from target characteristic information in a group of images of objects that are not the same.

In some embodiments, the determining of the category associated with the first data set based on the positional relationships comprises: determining whether positional relationships satisfy a preset condition; determining that the category associated with the first data set is a first category in the event that the positional relationships satisfy the preset condition, wherein the first category indicates that the targets in the N images corresponding to the data set belong to the same object; and determining that the category associated with the first data set is a second category in the event that the positional relationships do not satisfy a preset condition, wherein the second category indicates that the targets in the N images corresponding to the data set do not belong to the same object.

In some embodiments, the extracting of the target characteristic information from each image comprises: determining a position of the target in each image; extracting data sets corresponding to each image from the position of the target in each image; and regarding the data sets corresponding to each image as the target characteristic information in each image.

In some embodiments, the target characteristic information is facial characteristic information of people or animals, wherein the facial characteristic information includes: positions of facial features, shapes of facial features, ratios of facial features, or any combination thereof.

In some embodiments, the process further comprises: acquiring each data set in training sets and classifications corresponding to the data sets; obtaining a function model based on all the data sets in the training sets and the corresponding classifications, wherein the output of the function model is the correct classifications corresponding to the data sets in the event that the input is the data sets of the training sets; and regarding the function model as the data model.

In some embodiments, a device for image identification is further provided. The device comprises: a first acquiring unit configured to acquire N images, wherein N is a natural number greater than 1; an extracting unit configured to extract target characteristic information from each image to obtain a first data set corresponding to the N images; and a first determining unit configured to determine a category associated with the first data set corresponding to the N images based on the data model, wherein the category indicates whether targets in the N images corresponding to the data set belong to the same object. The data model is a model trained using multiple training sets. The multiple training sets include data sets generated from target characteristic information in a group of images of the same object.

In some embodiments, the first determining unit comprises: a first acquiring subunit configured to obtain, based on the first data set, a first similarity value corresponding to the first data set, wherein the first similarity value indicates a probability that the N images corresponding to the first data set belong to the same object; a second acquiring subunit configured to acquire positional relationships of the first similarity value in a data model, wherein the positional relationships are positional relationships between the first similarity value and similarity values corresponding to multiple training sets; and a determining subunit configured to determine a category associated with the first data set based on the positional relationships.

In some embodiments, the first acquiring subunit comprises: a first acquiring module configured to associate target characteristic information extracted from the N images to obtain a multidimensional vector; and a second acquiring module configured to obtain a first similarity value based on the multidimensional vector.

In some embodiments, the second acquiring module comprises: a first acquiring submodule configured to acquire weights corresponding to each dimension of the multidimensional vector, and a second acquiring submodule configured to obtain a first similarity value by subjecting the multidimensional vector to weighted sum based on the weights corresponding to each dimension.

In some embodiments, the first acquiring subunit comprises: a third acquiring module configured to conduct pairwise comparisons on target characteristic information extracted from N images to obtain $N(N-1)/2$ similarity values; a fourth acquiring module configured to associate the $N(N-1)/2$ similarity values to obtain a vector of $N(N-1)/2$ dimensions; and a fifth acquiring module configured to obtain a first similarity value based on the vector of $N(N-1)/2$ dimensions.

In some embodiments, the fifth acquiring module comprises: a third acquiring submodule configured to acquire weights corresponding to each dimension of the vector of $N(N-1)/2$ dimensions, and a fourth acquiring submodule configured to obtain, based on the weights corresponding to each dimension, a first similarity value by subjecting the vector of $N(N-1)/2$ dimensions to weighted sum.

In some embodiments, the multiple training sets further comprise: data sets generated from target characteristic information in a group of images of objects that are not the same.

In some embodiments, the determining subunit comprises: an determining module configured to determine whether positional relationships satisfy a preset condition; a first determining module configured to determine that a category associated with the first data set is a first category in the event that the positional relationships satisfy the present condition, wherein the first category indicates that the targets in the N images corresponding to the data sets belong to the same object; and a second determining module configured to determine that the category associated with the first data set is a second category in the event that the positional relationships do not satisfy the preset condition, wherein the second category indicates that the targets in the N images corresponding to the data sets do not belong to the same object.

In some embodiments, the extracting unit comprises: a first determining subunit configured to determine the position of the target in each image; an extracting subunit configured to extract the data set corresponding to each image from the position of the target in each image; and a second determining subunit configured to regard the data set corresponding to each image as the target characteristic information in each image.

In some embodiments, the target characteristic information is facial characteristic information of people or animals, wherein the facial characteristic information includes: positions of facial features, shapes of facial features, ratios of facial features, or any combination thereof.

In some embodiments, the device further comprises: a second acquiring unit configured to acquire each data set in training sets and classifications corresponding to the data sets; a third acquiring unit configured to obtain a function model based on the data sets in the training sets and the corresponding classifications, wherein the output of the function model is the correct classifications corresponding to the data sets in the event that the input is the data sets of the training sets; and a determining unit configured to regard the function model as the data model.

In some embodiments, a process for image identification is provided. The process comprises: presenting a first interface, wherein the first interface comprises a control for uploading images; receiving N images uploaded via the control; sending the N images to a server and analyzing the N images using the server; receiving, from the server, analysis result regarding the N images, wherein the server determines, using a data model, a category associated with a first data set corresponding to the N images. The category indicates whether targets in the N images corresponding to the data set belong to the same object. The data model is a model trained multiple training sets. The multiple training sets include: data sets generated from target characteristic information in a group of images of the same object.

In some embodiments, a device for image identification is provided. The device comprises: a presenting unit configured to present a first interface, wherein the first interface comprises a control for uploading images; a receiving unit configured to receive N images uploaded via the control; a second determining unit configured to send the N images to a server and analyze the N images via the server; and a second receiving unit configured to receive, from the server, the analysis result regarding the N images, wherein the server uses a data model to determine the category associated with the first data set corresponding to the N images. The first data set is a data set obtained by extracting target characteristic information from each image. The category indicates whether targets in the N images corresponding to the data set belong to the same object. The data model is a model trained using multiple training sets. The multiple training sets include data sets generated from target characteristic information in a group of images of the same object.

In some embodiments, a process for image identification is further provided. The process comprises: acquiring N images, wherein N is a natural number greater than 1; extracting target characteristic information from each image to obtain a first data set corresponding to the N images; obtaining, based on the first data set, a first similarity value corresponding to the first data set, wherein the first similarity value indicates a probability that the N images corresponding to the first data set belong to the same object; and determining, based on a relationship between the first similarity value and a preset threshold value, whether the targets in the N images corresponding to the data set belong to the same object.

In some embodiments, the obtaining of the first similarity value corresponding to the first data set comprises: conducting pairwise comparisons on target characteristic information extracted from the N images to obtain N(N−1)/2 similarity values; associating the N(N−1)/2 similarity values to obtain a vector of N(N−1)/2 dimensions; and obtaining the first similarity value based on the vector of N(N−1)/2 dimensions.

In some embodiments, the obtaining of the first similarity value based on the vector of N(N−1)/2 dimensions comprises: acquiring weights corresponding to each dimension of the vector of N(N−1)/2 dimensions, and obtaining a first similarity value by subjecting the vector of N(N−1)/2 dimensions to weighted sum based on the weights corresponding to each dimension.

In some embodiments, the obtaining of the first similarity value corresponding to the first data set comprises: conducting pairwise comparisons on target characteristic information extracted from N images to obtain N(N−1)/2 similarity values; acquiring weights corresponding to the N(N−1)/2 similarity values; and obtaining a first similarity value by subjecting the N(N−1)/2 similarity values to weighted sum based on the weights.

In some embodiments, a process for image identification is further provided. The process comprises: presenting a first interface, wherein the first interface comprises a control configured to upload images; receiving N images uploaded via the control; sending the N images to a server and analyzing the N images through the server; receiving the server's analysis result regarding the N images, wherein the server extracts target characteristic information from each image to obtain a first data set corresponding to N images; obtaining, based on the first data set, a first similarity value corresponding to the first data set, wherein the first similarity value indicates a probability that the N images corresponding to the first data set belong to the same object; and determining, based on a relationship between the first similarity value and a preset threshold value, whether the targets in the N images corresponding to a data set belong to the same object.

In some embodiments, a device for image identification is further provided. The device comprises: a present unit configured to present a first interface, wherein the first interface comprises a control for uploading images; a first receiving unit configured to receive N images uploaded via the control; a second analyzing unit configured to send the N images to a server and analyze the N images through the server; a second receiving unit configured to receive the server's analysis result regarding the N images, wherein the server extracts target characteristic information from each image to obtain a first data set corresponding to N images, obtain, based on the first data set, a first similarity value corresponding to the first data set, wherein the first similarity value indicates the probability that the N images corresponding to the first data set belong to the same object, and determine, based on the relationship between the first similarity value and a preset threshold value, whether the targets in the N images corresponding to a data set belong to the same object.

In some embodiments, the target characteristic information is extracted from each image, and a corresponding first data set is acquired. In addition, a data model is generated by subjecting data sets including the target characteristic information to training, and the category associated with the first data set is determined using the data model. The above approach attains a determination whether targets in the N images belong to the same object. The technical result thus increases the consistency of image identification results and thus reduces poor consistency in image determination results due to manual selection of multiple determination conditions for comparing images.

BRIEF DESCRIPTION OF THE DRAWINGS

Various embodiments of the invention are disclosed in the following detailed description and the accompanying drawings.

DETAILED DESCRIPTION

Figure 1:
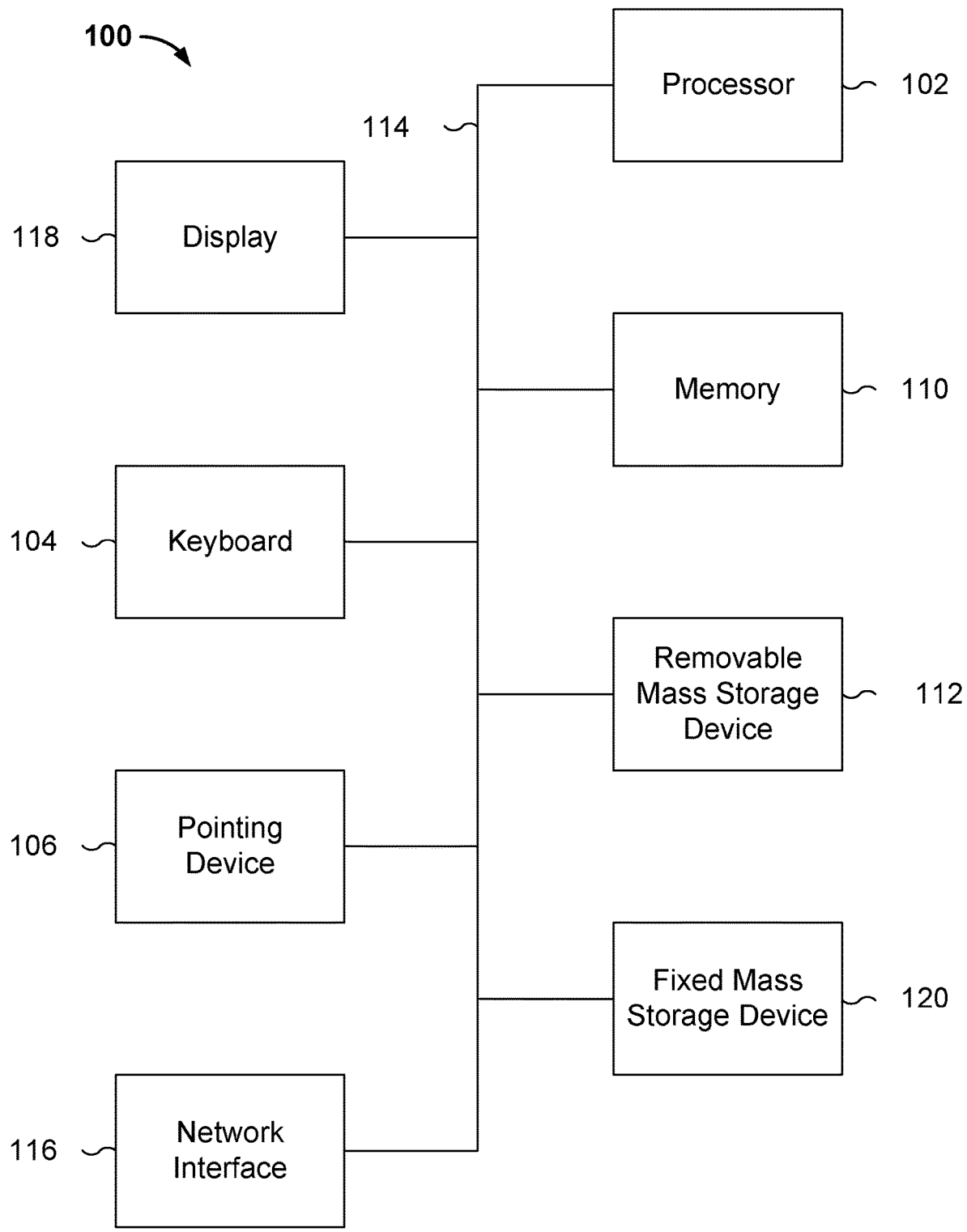
FIG. 1 is a functional diagram illustrating a programmed computer system for image identification in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In some embodiments, a process for image identification is provided. The process for image identification can be used for identity authentication of a user. For example, after a user registers with a finance-related application (app), the user's identity is to be confirmed. In the event that the user merely uploads an image, identifying the image based on this user's self-taken image is not possible. This inability to identify the image is because the user could have downloaded the image from the Internet for the purpose of impersonation. This inability to identify the image can be reduced if the user is required to upload more than one image. In the event that the user uploads more than one image, a determination of whether the user-uploaded images belong to the same object (e.g., the user's face) is made.

The following process can be implemented on an app installed on a mobile terminal. In other words, a mobile terminal app can determine whether multiple images from a user belong to the same object.

The following process can also be implemented on a server. For example, an app or software merely serves as an interface to acquire images. A user can upload the images via the app or software. Then the app or software sends the images to the server, which analyzes the images. Typically, the server's computing capability is more powerful than that of the app itself. Therefore, a large quantity of images from different apps or software can be simultaneously processed by the server. The server can be a true hardware server, or a service. With the development of cloud computing, such services can be located with other cloud services and provide processing.

Regardless of whether the process is implemented on a terminal or a server, the identification result of the following process can be used by other apps or services. For example, multiple images are recognized as not belonging to the same person. Moreover, in some embodiments, providing a degree to which they do not belong to the same person is possible. With such an analysis result, a determination can be made as to whether the user is a hacker trying to impersonate a legitimate user. The process of using multiple images to determine whether the images belong to the same object can be implemented in various situations.

FIG. 1 is a functional diagram illustrating a programmed computer system for image identification in accordance with some embodiments. As will be apparent, other computer system architectures and configurations can be used to perform identity authentication. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118).

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storages 112, 120 generally store additional programming instructions, data, and the like that typically are not in active use by the processor 102. It will be appreciated that the information retained within mass storages 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
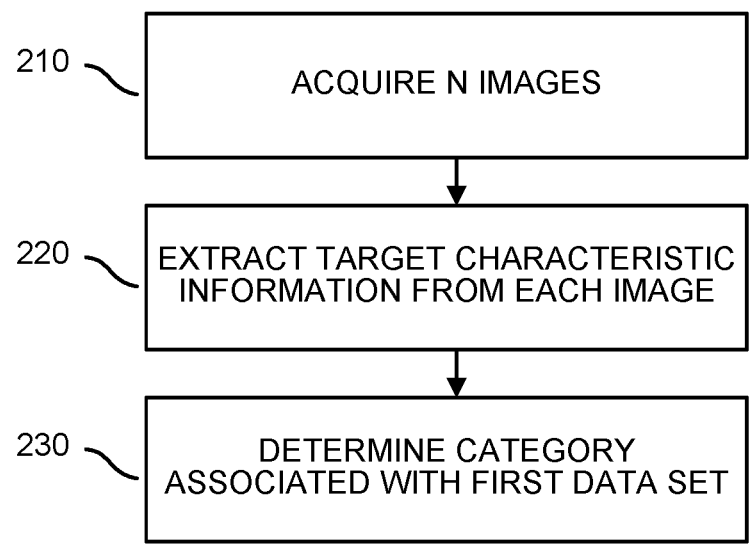
FIG. 2 is a flowchart of an embodiment of a process for image identification.

FIG. 2 is a flowchart of an embodiment of a process for image identification. In some embodiments, the process 200 is implemented by a client 2410 of FIG. 24 and comprises:

In 210, the client acquires N images. In some embodiments, N is a natural number greater than 1.

In some embodiments, the process 200 includes: acquiring N images; analyzing a target (e.g., an image of a human face) within each image, and determining whether the N images belong to the same object (e.g., a natural person), each of the N images including a target. In some embodiments, N is a natural number greater than 1. In the event that only one image exists, obtaining an accurate result in a special case of the process below is possible. Another approach includes presenting a prompt requesting the upload of images for comparison.

In 220, the client extracts target characteristic information from each image to obtain a first data set corresponding to the N images.

In some embodiments, the target characteristic information included in the target in each of the N images is extracted. The extracted target characteristic information includes characteristic information which can be used to differentiate between different targets. In some embodiments, target characteristic information for each image is stored in a vector.

In some embodiments, the target characteristic information is human or animal facial characteristic information. In some embodiments, the facial characteristic information includes: positions of facial features, shapes of facial features, ratios of facial features, or any combination thereof. The facial characteristic information can include the main features of the human face, such as the shapes, ratios, and relative positions of the eyes, eyebrows, nose, mouth, and other major features. Different human faces can be distinguished based on feature information such as the shapes, ratios, and relative positions of major features.

After the target characteristic information is extracted from the N images, the result is N pieces of the target characteristic information corresponding to the N images. A first data set corresponding to the N images is obtained based on the extracted N pieces of target characteristic information.

In 230, the client determines a category associated with the first data set corresponding to the N images based on a data model. In some embodiments, the category indicates whether the targets in the N images corresponding to a data set belong to the same object, and the data model is a model trained using multiple training sets. The multiple training sets include data sets generated from target characteristic information in a group of images of the same object.

As described above, the category of the first data set corresponding to the N images is determined based on a pre-generated data model (e.g., the nearest neighbor algorithm, abbreviated as the "KNN model"), and then a determination is made as to whether the N images are of the same object. The data model is generated in advance to determine whether the N images are of the same object.

In some embodiments, the generating of the data model include: acquiring each data set in training sets and classifications corresponding to the data sets; obtaining a function model based on the data sets in the training sets and the corresponding classifications. In some embodiments, the output of the function model is the correct classifications corresponding to the data sets in the event that the input is the data sets of the training sets, and the function model corresponds to the data model.

A number of objects are selected while the data model is being generated. For each of the objects, any image including its target can be selected, and target characteristic information is extracted from these images to generate a data set. This data set can serve as a training set. Learning training is conducted using multiple training sets generated based on multiple selected objects, and ultimately the data model is generated.

The training sets can be established from features of the same object. In other words, each group of images in the training set belongs to the same object. For better training, erroneous training sets (e.g., training sets that includes features of different objects) can also be provided. In some embodiments, multiple training sets also include: data sets generated from target characteristic information in a group of images that are not of the same object. In other words, during the generating of the training sets, the client can select any target-containing images of different objects to select target characteristic information from the images, and generate a data set that serves as a training set. The data model is used to determine the category associated with the first data set corresponding to the N images, and this category indicates whether the targets in the N images corresponding to the data set belong to the same object.

With the process described above, a data model is generated by subjecting data sets including target characteristic information for training, and the category associated with the first data set is determined using the data model. The above technique attains the determining of whether targets in the N images belong to the same object. The result thus achieves an increase in the consistency of image determination results and thus reduces poor consistency in image identification results that is a result of manual selection of multiple determination conditions for comparing images.

Figure 3:
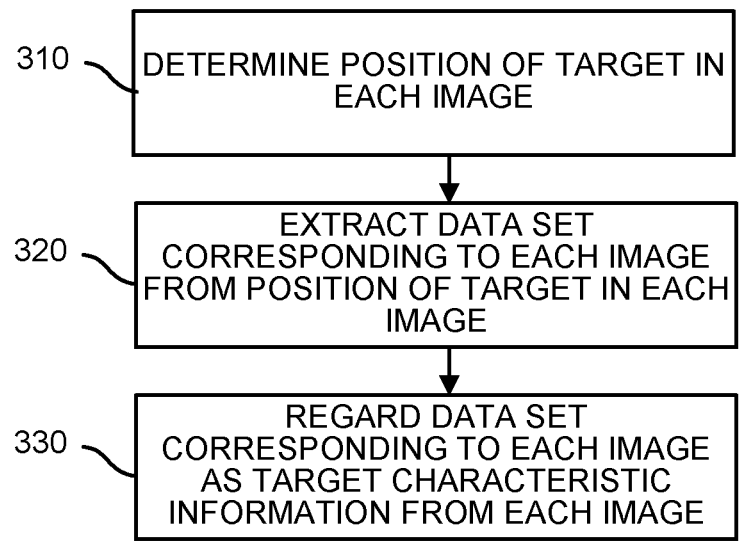
FIG. 3 is a flowchart of an embodiment of a process for extracting target characteristic information for each image.

FIG. 3 is a flowchart of an embodiment of a process for extracting target characteristic information for each image. The process 300 is an implementation of operation 220 of FIG. 2 and comprises:

In 310, the client determines a position of a target in each image.

In 320, the client extracts a data set corresponding to each image from the position of the target in each image. In some embodiments, the position of the target relates to the coordinate position in the image. In some embodiments, a series of convolutional filters are applied to the image to perform feature extraction. Caffe or other libraries can be used to implement the convolutional filters.

In 330, the client regards the data set corresponding to each image as target characteristic information from each image.

In the process 300 disclosed by above operations 310-330, in the event that the target characteristic information is to be extracted from each image, a determination is made regarding the position of the target in each image (e.g., the coordinates of a box enclosing a target). The position includes the scope of the position in the event that, shortly after the position is determined, the target characteristic information of each image is extracted. Then, in accordance with a preset target characteristic information extracting condition, corresponding data is extracted from the scope of the position where the target is located in each image, and a data set is formed. The data set corresponding to each image is the target characteristic information from that image.

Figure 4:
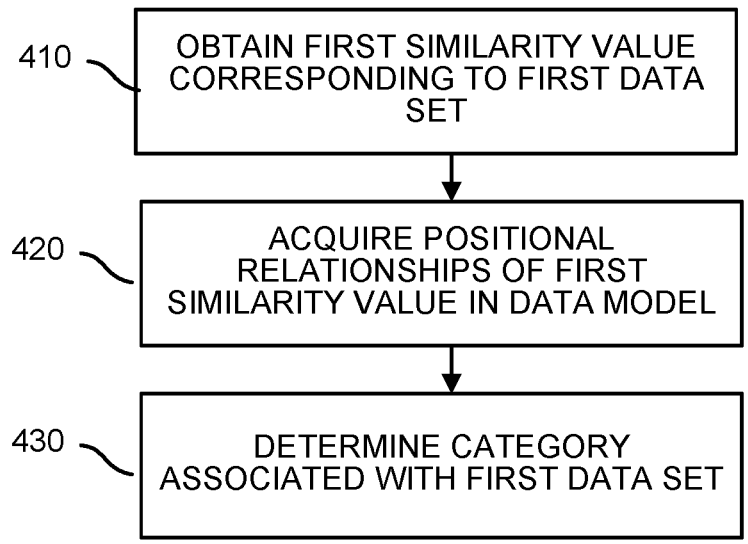
FIG. 4 is a flowchart of an embodiment of a process for determining a category associated with a first data set corresponding to N images.

FIG. 4 is a flowchart of an embodiment of a process for determining a category associated with a first data set corresponding to N images. In some embodiments, the process 400 is an implementation of operation 230 of FIG. 2 and comprises:

In 410, the client obtains, based on a first data set, a first similarity value corresponding to the first data set. In some embodiments, a similarity value indicates a probability that N images corresponding to the data set are of the same object.

Distance measurement (e.g., cosine distance or Euclidean distance) can be used to classify a multidimensional vector based on the first data set and calculate the first similarity value corresponding to the first data set.

In 420, the client acquires positional relationships of the first similarity value in the data model. In some embodiments, the positional relationships are the positional relationships between the first similarity value and similarity values corresponding to multiple training sets. In some embodiments, the positional relationships relate to a range of extracted features.

The data model can include multiple numerical similarity values. As soon as the first similarity value corresponding to the first data set is input to the data model, acquiring the positional relationships of the first similarity value in the data model is possible.

In 430, the client determines the category associated with the first data set based on the positional relationships.

In the process 400 disclosed by the above operations 410-430, the first similarity value can be obtained based on a first data set. In some embodiments, the first similarity value indicates the probability that the N images are of the same object. The data model can include similarity levels corresponding to multiple training sets used in the training of the data model. These similarity levels can be used to indicate the probability that the multiple images selected during the generation of the training set belong to the same object.

Figure 5:
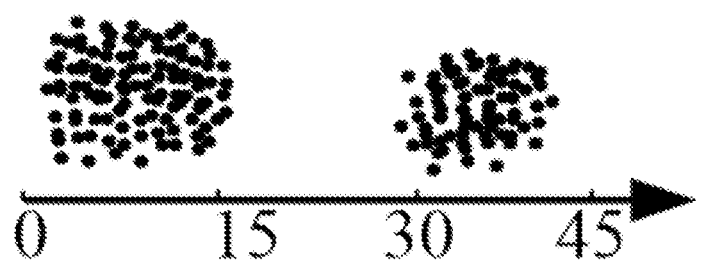
FIG. 5 is a diagram of an embodiment of a data model.

FIG. 5 is a diagram of an embodiment of a data model. The data model can be obtained after training using multiple training sets. The x-axis corresponds to similarity value. In FIG. 5, various dots are shown at various heights (y-axis) to differentiate, for the reader, between dots having the same X value. Each point indicates a numerical similarity value, and the distance between points indicates a difference between numerical similarity values corresponding to data sets generated from target characteristic information from one group of images versus another group of images. The multiple points located on the left side of the arrow coordinates indicate data sets generated from target characteristic information from a group of images that included different objects, while the multiple points concentrated on right side of the arrow coordinates indicate data sets generated from target characteristic information from a group of images that included the same object. For example, the similarity threshold value is set to 25 in some embodiments. In other words, in the event that the similarity level of the first data set corresponding to the N images is greater than or equal to 25, the targets in the N images are determined to be one and the same. In the event that the similarity level of the first data set corresponding to the N images is less than 25, the targets in the N images are determined to be different.

Figure 6:
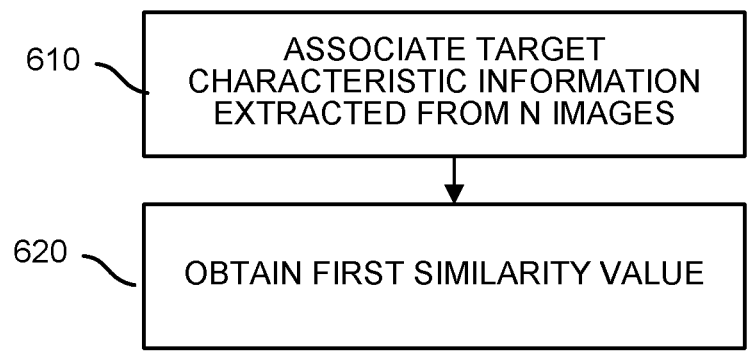
FIG. 6 is a flowchart of an embodiment of a process for obtaining a first similarity value corresponding to a first data set.

FIG. 6 is a flowchart of an embodiment of a process for obtaining a first similarity value corresponding to a first data set. In some embodiments, process 600 is an implementation of operation 410 of FIG. 4 and comprises:

In 610, the client associates target characteristic information extracted from N images to obtain a multidimensional vector.

In 620, the client obtains a first similarity value based on the multidimensional vector.

In process 600 disclosed by the above operations 610 and 620, the target characteristic information that was extracted from the N images is in the first data set and is associated to obtain a multidimensional vector. For example, in some embodiments, the target characteristic information from one image is a 1×M vector, and with N images, the multidimensional vector is an N×M vector. Distance measurement (e.g., cosine distance or Euclidean distance) can be used to classify the multidimensional vector and obtain the first similarity level corresponding to the first data set.

Figure 10:
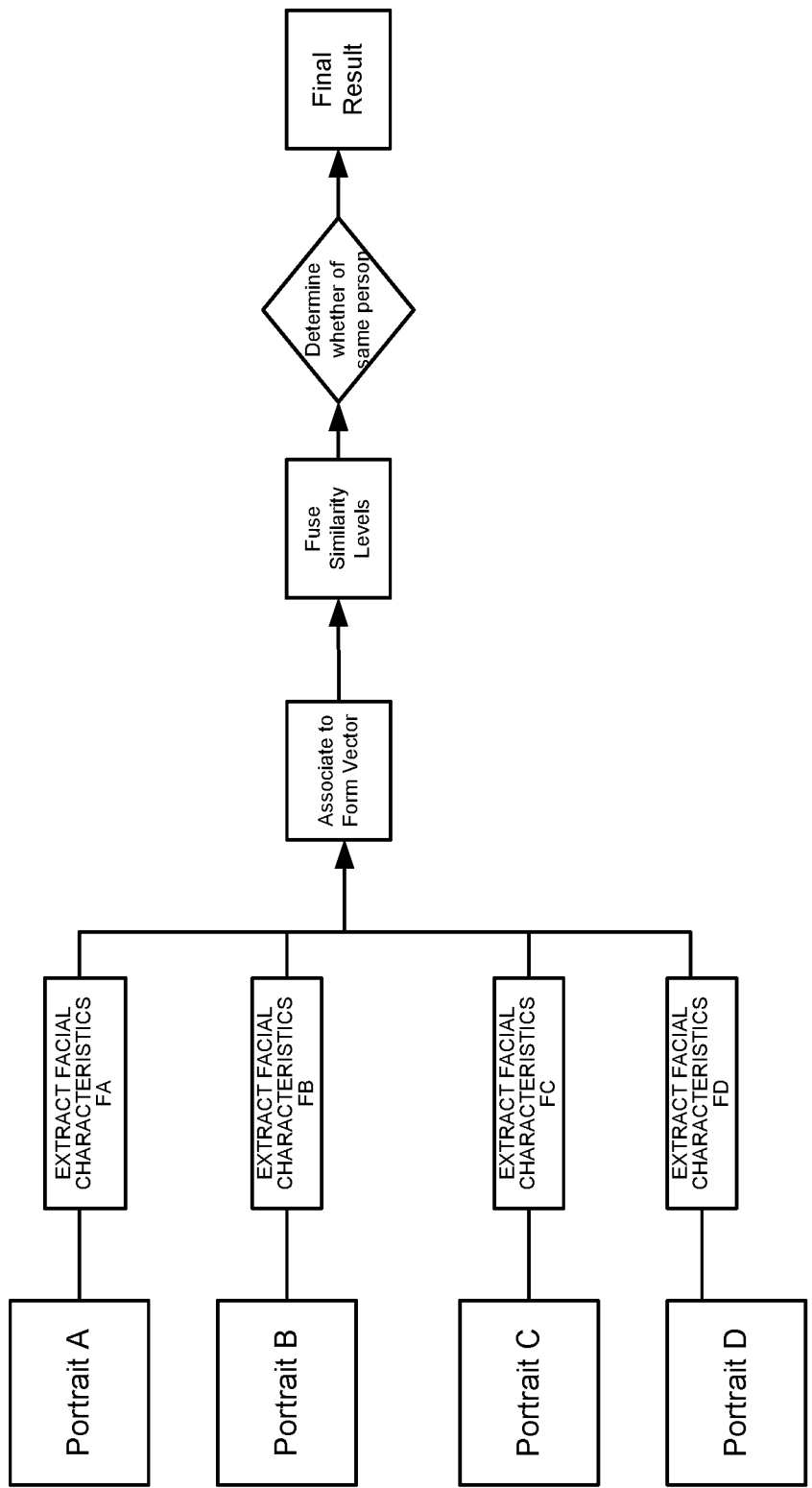
FIG. 10 is a diagram of an embodiment of a process for image identification.

FIG. 10 is a diagram of an embodiment of a process for image identification. Using as an example, facial characteristic information for the target characteristic information. Four images—portrait A, portrait B, portrait C, and portrait D—are to be analyzed. The target characteristic information can be extracted from the four images to obtain a first data set. In some embodiments, the first data set includes facial characteristics Fa, facial characteristics Fb, facial characteristics Fc, and facial characteristics Fd. The N-image target characteristic information in the first data set can be combined to obtain a first associated characteristics vector (equivalent to the multidimensional vector in operation 610 of FIG. 6). A merged similarity level (equivalent to the first similarity value) is obtained based on the associated characteristics vector. Lastly, a determination is made based on the merged similarity level as to whether the four images belong to the same object, and a final result is obtained.

In some embodiments, the obtaining of the first similarity value based on the multidimensional vector comprises: acquiring weights corresponding to each dimension of the multidimensional vector, and obtaining a first similarity value by subjecting the multidimensional vector to weighted sum based on the weights corresponding to each dimension. In other words, a vector of different dimensions can correspond to different weights, and the first similarity value is obtained by multiplying the multidimensional vector weighted sum with weights corresponding to each dimension and combining the multiplication results. For example, in a multidimensional vector resulting from the merger of multiple images (including image A and image B), the vector corresponding to the target characteristic information extracted from image A and the vector corresponding to the target characteristic information extracted from image B are weighted differently. A first similarity value corresponding to the multidimensional vector is obtained by multiplying the multidimensional vector to weighted sumweights corresponding to each dimension in the multidimensional vector and summing the multiplication results.

Figure 7:
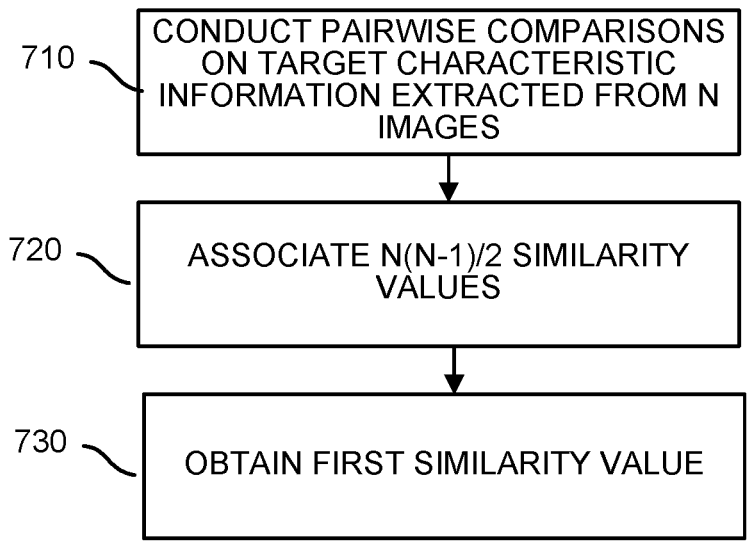
FIG. 7 is a flowchart of another embodiment of a process for obtaining a first similarity value corresponding to a first data set.

FIG. 7 is a flowchart of another embodiment of a process for obtaining a first similarity value corresponding to a first data set. In some embodiments, process 700 is an implementation of operation 410 of FIG. 4 and comprises:

In 710, the client conducts pairwise comparisons on target characteristic information extracted from N images to obtain N(N−1)/2 similarity values.

In 720, the client associates the N(N−1)/2 similarity values to obtain a vector of N(N−1)/2 dimensions.

In 730, the client obtains a first similarity value based on the vector of N(N−1)/2 dimensions.

In the process 700 including the above operations 710-730, the N-image target characteristic information extracted from the N images in the first data set undergoes pairwise comparison. The client obtains the N(N−1)/2 similarity values based on the pairwise comparison statuses of the targets in each pair of images. For example, if there are 4 images (A, B, C, and D), and pairwise comparisons are conducted between any two images, then results from the pairwise comparisons AB, AC, AD, BC, BD, and CD (6 results) are obtained. The client then associates the N(N−1)/2 similarity values to obtain a multidimensional vector of N(N−1)/2 dimensions. Lastly, the client obtains, based on the obtained multidimensional vector of N(N−1)/2 dimensions, a first similarity level corresponding to the first data set.

Figure 8:
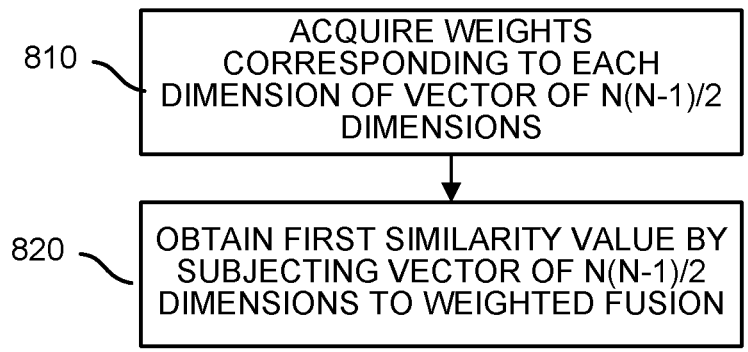
FIG. 8 is a flowchart of an embodiment of a process for obtaining a first similarity level corresponding to the first data set.

FIG. 8 is a flowchart of an embodiment of a process for obtaining a first similarity level corresponding to the first data set. In some embodiments, process 800 is an implementation of operation 730 of FIG. 7 and comprises:

In 810, the client acquires weights corresponding to each dimension of a vector of N(N−1)/2 dimensions.

In 820, the client obtains a first similarity value by subjecting the vector of N(N−1)/2 dimensions to weighted sum based on the weights corresponding to each dimension.

In process 800, which includes the above operations 810 and 820, the weights corresponding to the vector of N(N−1)/2 dimensions are set in advance. After the multidimensional vector of N(N−1)/2 dimensions is obtained, the first similarity value is obtained by subjecting the vector of N(N−1)/2 dimensions to weighted sum based on the preset weights. In some embodiments, a machine-learning algorithm can be used to determine the weights. For example, the weights are learned using a primary component algorithm (PCA) or a support vector machine (SVM). The first similarity value is then obtained by subjecting the vector of N(N−1)/2 dimensions to weighted sum.

Figure 11:
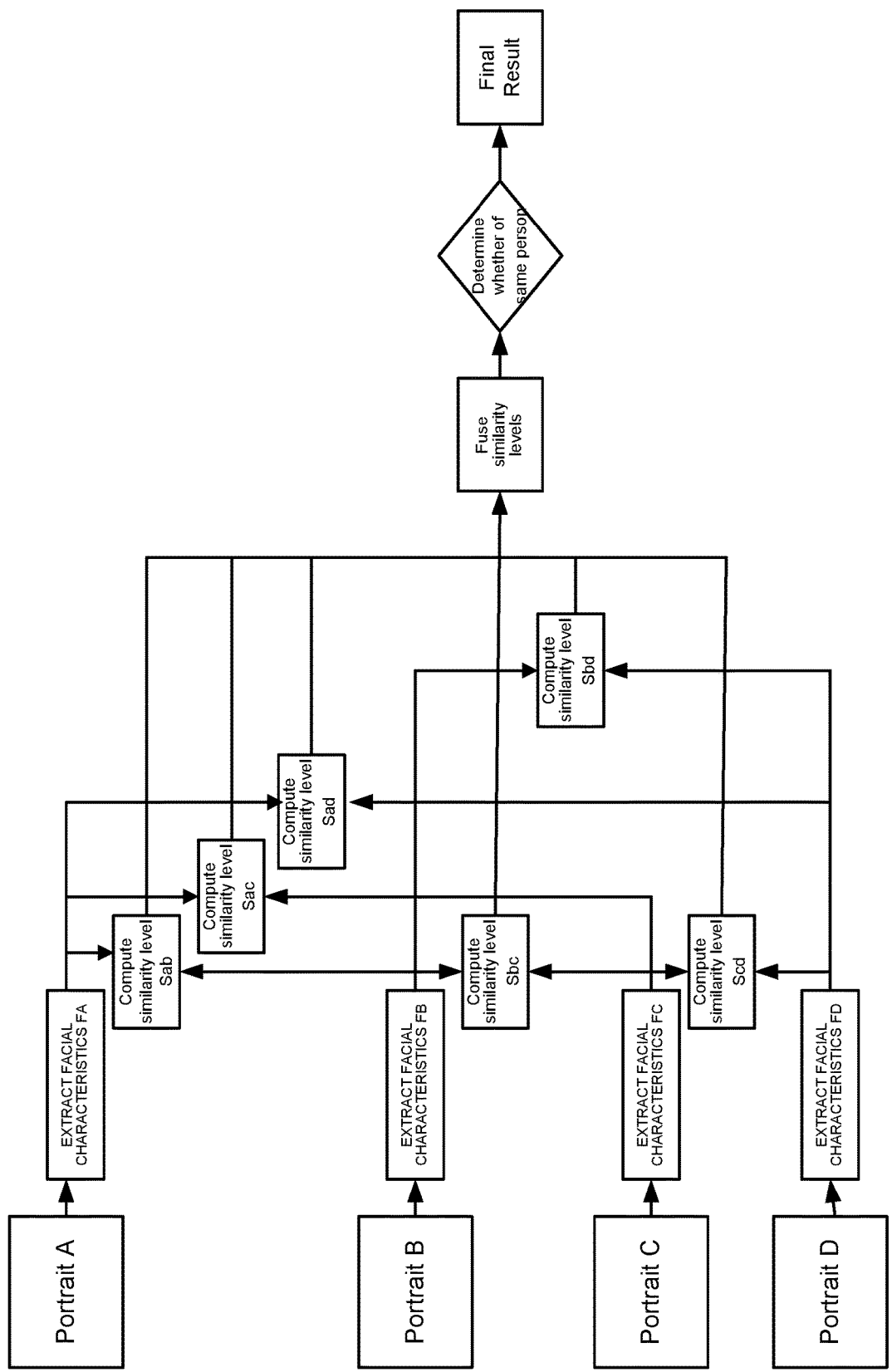
FIG. 11 is a diagram of an embodiment of a process for image identification.

FIG. 11 is a diagram of an embodiment of a process for image identification. As an example, a total of four images—portrait A, portrait B, portrait C, and portrait D—are to be analyzed. Target characteristic information is extracted from the four images described above to obtain a first data set. In some embodiments, the first data set includes facial characteristics Fa, facial characteristics Fb, facial characteristics Fc, and facial characteristics Fd. The N-image target characteristic information in the first data set undergoes pairwise comparison to obtain N(N−1)/2 similarity values. In some embodiments, N=4 and a total of 4*3/2=6 similarity values are obtained. The similarity values thus obtained are then associated to obtain a multidimensional vector of 6 dimensions. This vector of 6 dimensions is subjected to weighted sum based on preset weights for each dimension. The result of the weighted sum is a combined similarity level (equivalent to the first similarity value in step 820 of FIG. 8). For example, different weights can be allocated based on image quality. The weights for two relatively clear images can be set higher than weights of unclear images, and the similarity level corresponding to two relatively clear images can receive more weight. For example, portraits A and B are clearer than portraits C and D. In other words, the target characteristic information of portraits A and B undergoes pairwise comparison to obtain a similarity level, and the weight corresponding to portraits A and B is set somewhat higher. In another example, the target characteristic information of portraits C and D undergoes pairwise comparison to obtain a similarity level, and the weight corresponding to portraits C and D is set somewhat lower. The same weights can also be directly used based on other embodiments of the present application.

In some embodiments, the above four images are analyzed based on the combined similarity level as to whether they belong to the same object, and a final result is obtained.

Figure 9:
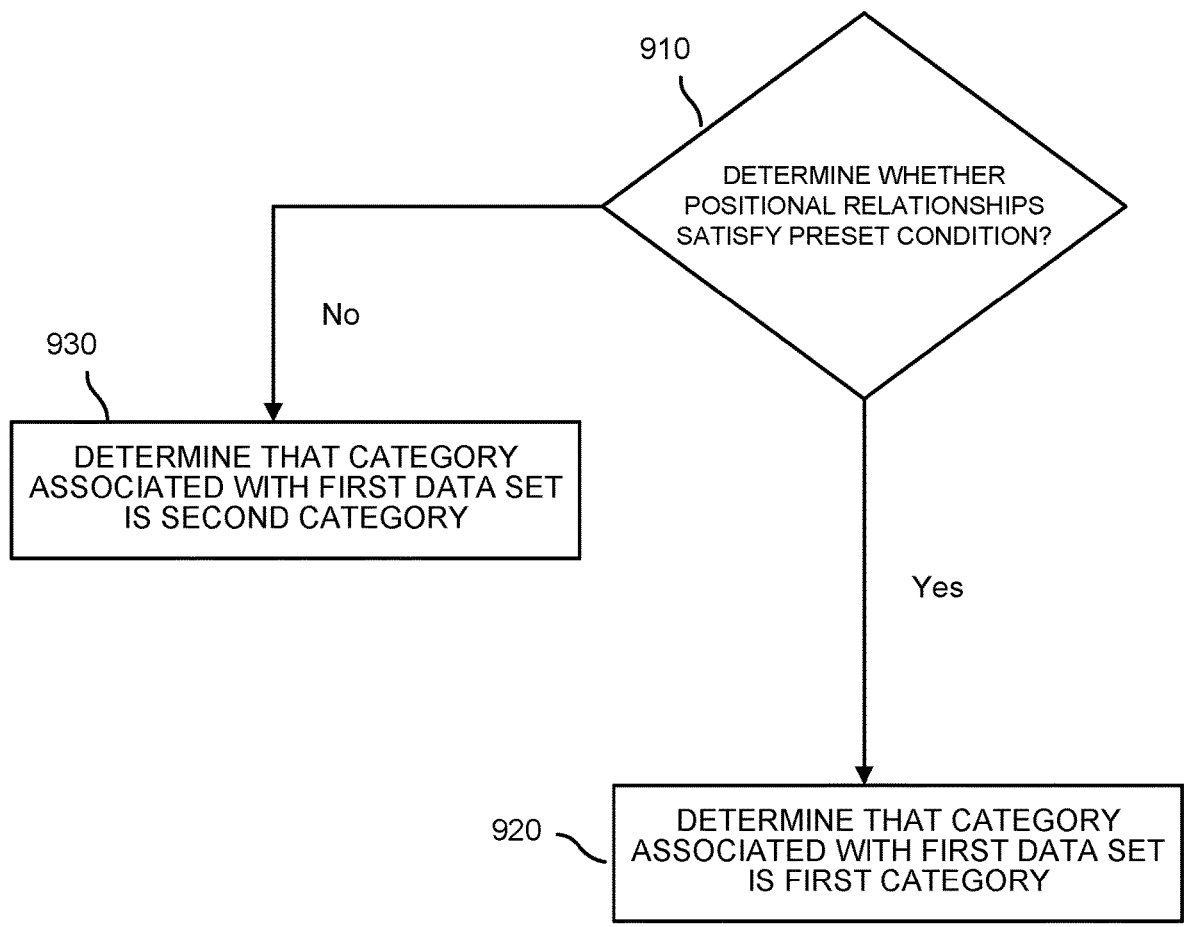
FIG. 9 is a flowchart of an embodiment of a process for determining a category associated with the first data set.

FIG. 9 is a flowchart of an embodiment of a process for determining a category associated with the first data set. In some embodiments, process 900 is an implementation of operation 430 of FIG. 4 and comprises:

In 910, the client determines whether positional relationships satisfy a preset condition.

In 920, the client, in the event that the positional relationships satisfy the preset condition, determines that the category associated with the first data set is a first category. In some embodiments, the first category indicates that the targets in the N images corresponding to a data set belong to the same object.

In 930, the client, in the event that the positional relationships do not satisfy the preset condition, determines that the category associated with the first data set is a second category. In some embodiments, the second category indicates that the targets in the N images corresponding to a data set do not belong to the same object.

In process 900, which includes operations 910-930, determining, based on the positional relationships between the first similarity level and similarity levels corresponding to multiple training sets in a data model, the category associated with the first data set, i.e., whether the targets in the N images corresponding to the first data set belong to the same object. In some embodiments, a determining condition is set in advance. After the positional relationships between a first similarity level and the similarity levels corresponding to multiple training sets in a data model are acquired, a determination is made as to whether the positional relationships satisfy the determining condition. In the event that the positional relationships satisfy the determining condition, the first data set is determined as belonging to a first category, and the targets in the N images corresponding to the first data set belong to the same object. In the event that the positional relationships do not satisfy the determining condition, the first data set is determined as belonging to a second category, and the targets in the N images corresponding to the first data set do not belong to the same object.

In some embodiments, the target characteristic information is extracted from each image, and a corresponding first data set is acquired. Moreover, a data model is generated by subjecting data sets including target characteristic information to training, and the category associated with the first data set is determined using the data model. The above approach determines whether targets in the N images belong to the same object. The result thus achieves an increase in the consistency of image identification results and thus reduces a lack of consistency in image identification results due to manual selection of multiple determination conditions for comparing images.

In some embodiments, target characteristic information is extracted from each of N images to determine whether the targets in the N images belong to the same object. Comparative determinations are made on the extracted target characteristic information corresponding to the N images, and then a determination is made as to whether the N images belong to the same object. To maintain consistency of identification conditions in the event that the extracted target characteristic information is subjected to comparative determinations, multiple objects are pre-selected, the target characteristic information is extracted from multiple images, and the data set of extracted target characteristic information of each object serves as a training set. A data model is generated after being trained using multiple training sets. This data model is used to conduct comparative determinations on target characteristic information of the N images, and in this way the consistency of determination results is maintained.

In the event that target characteristic information extracted from the N images is determined based on the data model, the target characteristic information extracted from the N images is associated to form a multidimensional vector. The obtaining of the first similarity value is based on the multidimensional vector. This first similarity value indicates the probability that the N images belong to the same object. A determination is made as to whether the N images belong to the same natural person based on the relative positions of the first similarity value vis-à-vis the similarity values corresponding to each training set in the data model.

In the event that target characteristic information extracted from the N images is determined based on the data model, the target characteristic information extracted from the N images can also undergo pairwise comparison to obtain N(N−1)/2 similarity values. The N(N−1)/2 similarity values can be associated to obtain a multidimensional vector and then obtain a first similarity value. A determination is made whether the N images belong to the same natural person based on the relative positions of the first similarity value vis-à-vis the similarity values corresponding to each training set in the data model.

Figure 12:
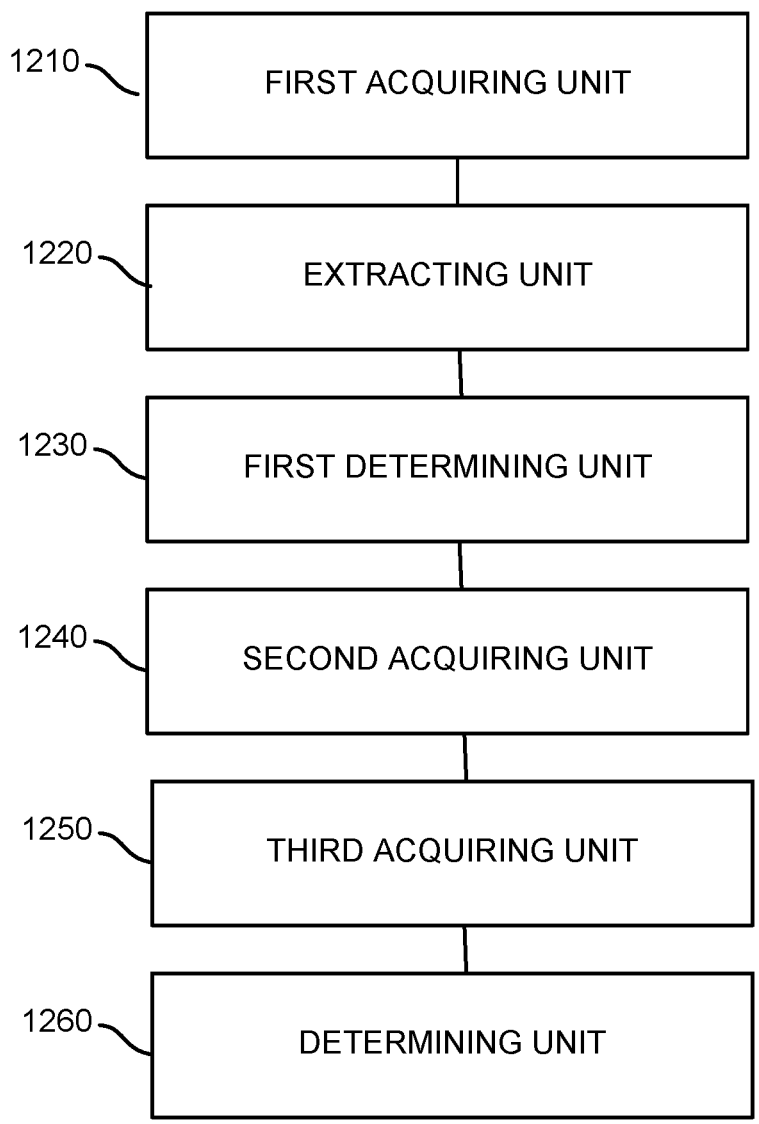
FIG. 12 is a diagram of an embodiment of a device for image identification.

FIG. 12 is a diagram of an embodiment of a device for image identification. In some embodiments, the device 1200 is configured to implement the process 200 of FIG. 2 and comprises: a first acquiring unit 1210, an extracting unit 1220, a first determining unit 1230, a second acquiring unit 1240, a third acquiring unit 1250, and a determining unit 1260.

In some embodiments, the first acquiring unit 1210 is configured to acquire N images. In some embodiments, N is a natural number greater than 1.

In some embodiments, the device 1200 acquires N images, determines a target in each image, and thus determines whether the N images belong to the same object. In some embodiments, N is any natural number greater than or equal to 2, and each of the N images includes a target. In the event that only one image exists, obtaining an accurate result is possible.

In some embodiments, the extracting unit 1220 is configured to extract target characteristic information from each image to obtain a first data set corresponding to the N images.

In some embodiments, the extracting unit 1220 extracts target characteristic information included in the target in each of the N images. The extracted target characteristic information includes characteristic information which can be used to differentiate between different targets.

In some embodiments, the target characteristic information is human or animal facial characteristic information. In some embodiments, the facial characteristic information includes: positions of facial features, shapes of facial features, ratios of facial features, or any combination thereof. Please note that the facial characteristic information can include the main features of the human face, such as the shapes, ratios, relative positions of the eyes, eyebrows, nose, mouth, and other major features. Different human faces can be distinguished based on feature information such as the shapes, ratios, and relative positions of major features.

After target characteristic information is extracted from the N images, the result includes N pieces of target characteristic information corresponding to the N images. The extracting unit 1220 can obtain a first data set corresponding to the N images based on the extracted N pieces of target characteristic information.

In some embodiments, the first determining unit 1230 is configured to determine the category associated with the first data set corresponding to the N images based on a data model. In some embodiments, the category indicates whether targets in the N images corresponding to the data set belong to the same object. The data model is a model trained using multiple training sets. The multiple training sets include: data sets generated from target characteristic information for a group of images of the same object.

In process 1200, the first determining unit 1230 determines the category of the first data set corresponding to the N images based on a pre-generated data model (e.g., the nearest neighbor algorithm, abbreviated as the "KNN model") and then determines whether the N images are of the same object. The data model is generated in advance to determine whether the N images are of the same object.

In some embodiments, the second acquiring unit 1240 is configured to acquire each data set in training sets and classifications corresponding to the data sets.

In some embodiments, the third acquiring unit 1250 is configured to obtain a function model based on the data sets in the training sets and the corresponding classifications.

In some embodiments, the output of the function model is the correct classifications corresponding to the data sets, and in the event that the input is the data sets of the training sets, the determining unit 1260 is configured to regard the function model as a data model.

A number of objects can be selected while the data model is being generated. For each of the objects, any image including its target can be selected, and target characteristic information can be extracted from these images to generate a data set. This data set serves as a training set. The training is conducted using multiple training sets based on multiple selected objects, and ultimately the data model is generated.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices. The functions of the units may be merged into one another or further split into multiple sub-units.

The methods or algorithmic steps described in light of the embodiments disclosed herein can be implemented using hardware, processor-executed software units, or combinations of both. Software units can be installed in random-access memory (RAM), memory, read-only memory (ROM), electrically programmable ROM, electrically erasable programmable ROM, registers, hard drives, removable disks, CD-ROM, or any other forms of storage media known in the technical field.

Figure 13:
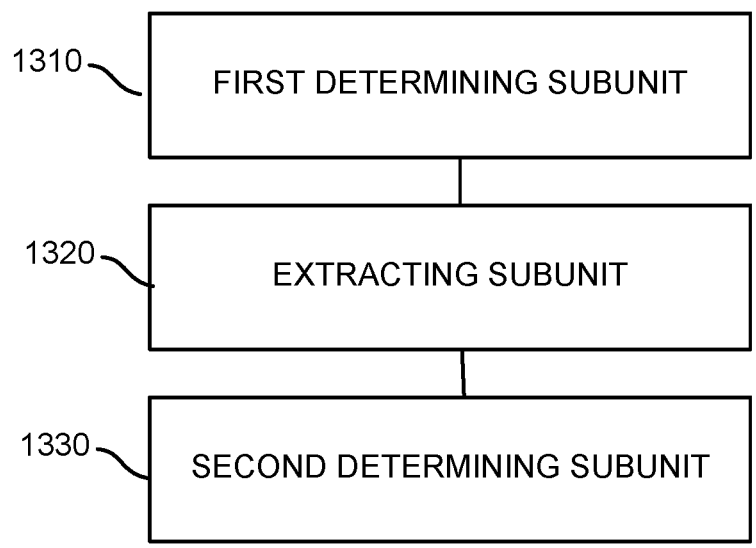
FIG. 13 is a diagram of an embodiment of an extracting unit.

FIG. 13 is a diagram of an embodiment of an extracting unit. In some embodiments, the extracting unit 1300 is an implementation of the extracting unit 1220 of FIG. 12 and comprises: a first determining subunit 1310, an extracting subunit 1320, and a second determining subunit 1330.

In some embodiments, the first determining subunit 1310 is configured to determine a position of a target in each image.

In some embodiments, the extracting subunit 1320 is configured to extract a data set corresponding to each image from the position of the target in each image.

In some embodiments, the second determining subunit 1330 is configured to regard the data set corresponding to each image as target characteristic information from each image.

In some embodiments, in the event that target characteristic information is to be extracted from each image, the first determining subunit 1310 first determines the position of the target in each image. The position includes a scope of the position in the event that, shortly after the position is determined, the target characteristic information of each image is extracted. Then, the extracting unit 1320, based on a preset target characteristic information extracting condition, extracts corresponding data from the scope of the position where the target is located in each image, and a data set is formed. The second determining subunit 1330 regards the data set corresponding to each image as the target characteristic information from that image.

In some embodiments, the multiple training sets further comprise: data sets generated from target characteristic information in a group of image of objects that are not the same.

In the above process of generating the training sets, selecting any target-containing images of different objects to select target characteristic information from the images, and generate a data set, which is to serve as a training set, is possible.

Figure 14:
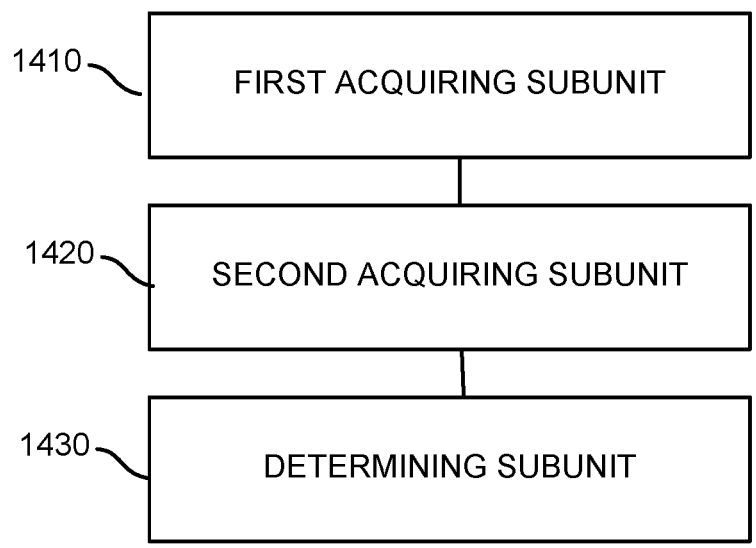
FIG. 14 is a diagram of an embodiment of a first determining unit.

FIG. 14 is a diagram of an embodiment of a first determining unit. In some embodiments, the first determining unit 1400 is an implementation of the first determining unit 1230 of FIG. 12 and comprises: a first acquiring subunit 1410, a second acquiring subunit 1420, and a determining subunit 1430.

In some embodiments, the first acquiring subunit 1410 is configured to obtain, based on the first data set, a first similarity value corresponding to the first data set. In some embodiments, the first similarity value indicates the probability that the N images corresponding to the first data set belong to the same object.

In some embodiments, the second acquiring subunit 1420 is configured to acquire positional relationships of the first similarity value in the data model. In some embodiments, positional relationships are the positional relationships between the first similarity value and the similarity values corresponding to multiple training sets.

In some embodiments, the determining subunit 1430 is configured to determine the category associated with the first data set based on the positional relationships.

As discussed above, the first acquiring subunit 1410 can obtain a first similarity value based on the first data set. In some embodiments, the first similarity value indicates the probability that the N images are of the same object. The data model includes similarity levels corresponding to multiple training sets used in training the data model. These similarity levels can be used to indicate the probability that the multiple images selected during generation of the training set belong to the same object. After obtaining the first similarity value, the second acquiring subunit 1420 compares the first similarity value with similarity levels corresponding to multiple training sets in a data model and acquires the positional relationships between the first similarity level and the multiple similarity levels in the data model. The determining subunit 1430 determines the category of the first data set based on the positional relationships. In accordance with the data model and through process 1400, the N images are determined whether they belong to the same object.

Figure 15A:
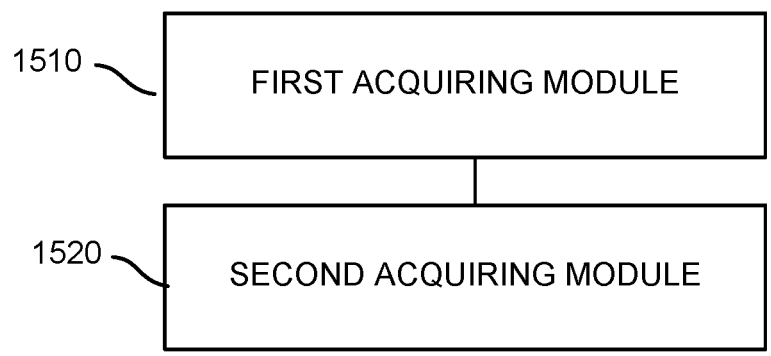
FIG. 15A is a diagram of an embodiment of a first acquiring subunit.

FIG. 15A is a diagram of an embodiment of a first acquiring subunit. In some embodiments, the first acquiring subunit 1500 is an implementation of the first acquiring subunit 1410 of FIG. 14 and comprises: a first acquiring module 1510 and a second acquiring module 1520.

In some embodiments, the first acquiring module 1510 is configured to associate target characteristic information extracted from N images to obtain a multidimensional vector.

In some embodiments, the second acquiring module 1520 is configured to obtain a first similarity value based on the multidimensional vector.

As discussed above, the first acquiring module 1510 associates N-image target characteristic information that was extracted from N images and is in the first data set to obtain a multidimensional vector. The second acquiring module 1520 classifies the multidimensional vector based on a classifier and obtains the first similarity level corresponding to the first data set. In some embodiments, in the process 900 of FIG. 9, a total of four images—portrait A, portrait B, portrait C, and portrait D—are to be analyzed. Target characteristic information is extracted from the four images described above to obtain a first data set. In some embodiments, the first data set includes facial characteristics Fa, facial characteristics Fb, facial characteristics Fc, and facial characteristics Fd. The N-image target characteristic information in the first data set is associated to obtain a first associated characteristics vector (equivalent to the multidimensional vector in operation 610 of FIG. 6). A merged similarity level (equivalent to the first similarity value) is obtained based on the associated characteristics vector. Lastly, a determination is made based on the merged similarity level as to whether the four images belong to the same object, and a final result is obtained.

Figure 15B:
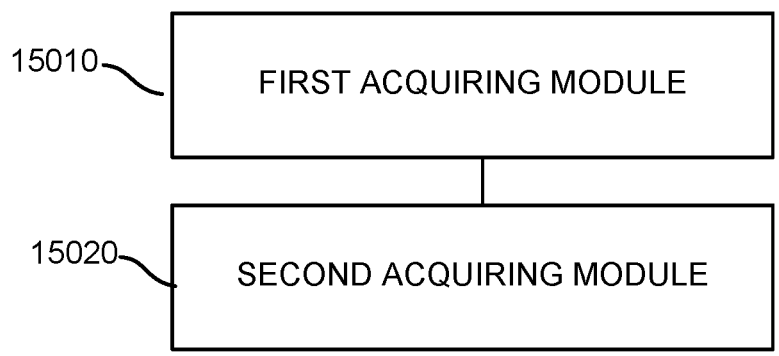
FIG. 15B is a diagram of an embodiment of a second acquiring subunit.

FIG. 15B is a diagram of an embodiment of a second acquiring subunit. In some embodiments, the second acquiring subunit 15000 is an implementation of the second acquiring subunit 1420 of FIG. 14 and comprises: a first acquiring module 15010 and a second acquiring module 15020.

In some embodiments, the first acquiring submodule 15010 is configured to acquire weights corresponding to each dimension of the multidimensional vector.

In some embodiments, the second acquiring submodule 15020 is configured to obtain a first similarity value by subjecting the multidimensional vector to weighted sum based on the weights corresponding to each dimension. In other words, a vector of different dimensions can correspond to different weights, and the first similarity value is obtained by subjecting the multidimensional vector to weighted sum based on the weights corresponding to each dimension. For example, in a multidimensional vector resulting from the merger of multiple images (including image A and image B), the vector corresponding to the target characteristic information extracted from image A and the vector corresponding to the target characteristic information extracted from image B are weighted differently. A first similarity value corresponding to the multidimensional vector can be obtained by subjecting the multidimensional vector to weighted sum based on the weights corresponding to each dimension in the multidimensional vector.

Figure 16:
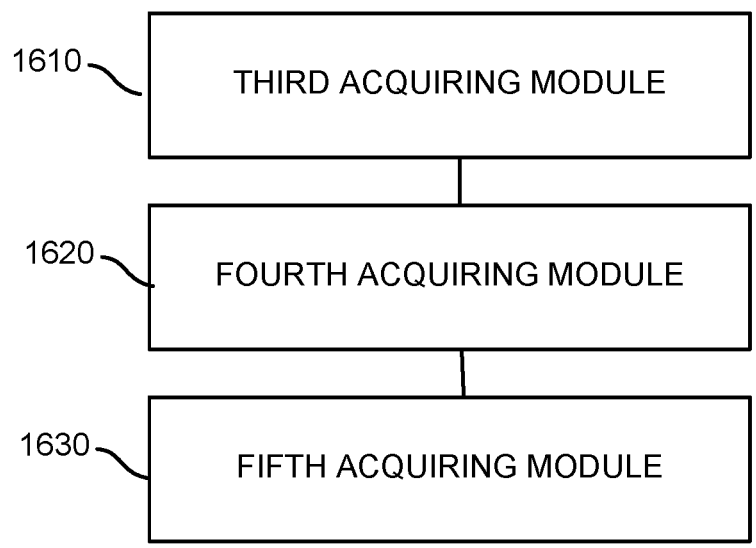
FIG. 16 is a diagram of another embodiment of a first acquiring subunit.

FIG. 16 is a diagram of another embodiment of a first acquiring subunit. In some embodiments, the first acquiring subunit 1600 is an implementation of the first acquiring subunit 1410 of FIG. 14 and comprises: a third acquiring module 1610, a fourth acquiring module 1620, and a fifth acquiring module 1630.

In some embodiments, the third acquiring module 1610 configured to conduct pairwise comparisons on target characteristic information extracted from N images to obtain N(N−1)/2 similarity values.

In some embodiments, the fourth acquiring module 1620 configured to associate the N(N−1)/2 similarity values to obtain a vector of N(N−1)/2 dimensions.

In some embodiments, the fifth acquiring module 1630 configured to obtain a first similarity value based on the multidimensional vector of N(N−1)/2 dimensions.

As discussed above, the third acquiring module 1610 subjects the N-image target characteristic information extracted from N images in the first data set to pairwise comparisons. The pairwise comparison statuses of the targets in each pair of images serve as a basis for obtaining N(N−1)/2 similarity values. The fourth acquiring module 1620 associates the N(N−1)/2 similarity values to obtain a multidimensional vector of N(N−1)/2 dimensions. The fifth acquiring module 1630 obtains a first similarity level corresponding to the first data set based on the multidimensional vector of N(N−1)/2 dimensions.

Figure 17:
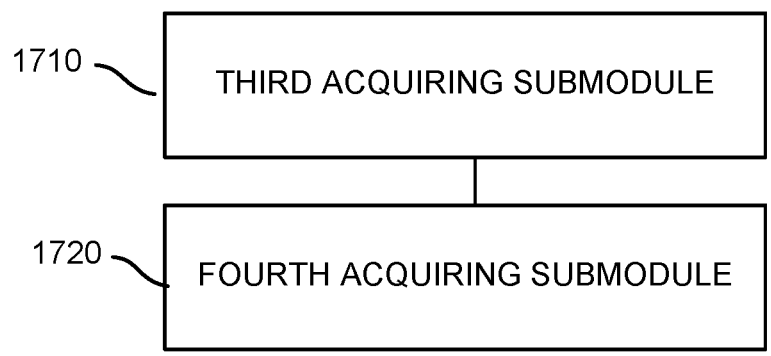
FIG. 17 is a diagram of another embodiment of a fifth acquiring module.

FIG. 17 is a diagram of another embodiment of a fifth acquiring module. In some embodiments, the fifth acquiring module 1700 is an implementation of the fifth acquiring module 1630 of FIG. 16 and comprises: a third acquiring submodule 1710 and a fourth acquiring submodule 1720.

In some embodiments, the third acquiring submodule 1710 is configured to acquire weights corresponding to each dimension of a vector of N(N−1)/2 dimensions.

In some embodiments, the fourth acquiring submodule 1720 is configured to subject, based on the weights corresponding to each dimension, the vector of N(N−1)/2 dimensions to weighted sum to obtain a first similarity value.

As discussed above, the third acquiring submodule 1710 acquires the preset weights corresponding to the vector of N(N−1)/2 dimensions. After obtaining the multidimensional vector of N(N−1)/2 dimensions, the fourth acquiring submodule 1720 obtains the first similarity value by subjecting, based on the preset weights, the vector of N(N−1)/2 dimensions to weighted sum. In some embodiments, a machine-learning technique is employed. For example, the weights are learned using a primary component algorithm (PCA) or a support vector machine (SVM). The first similarity value is then obtained by subjecting the vector of N(N−1)/2 dimensions to weighted sum.

Figure 18:
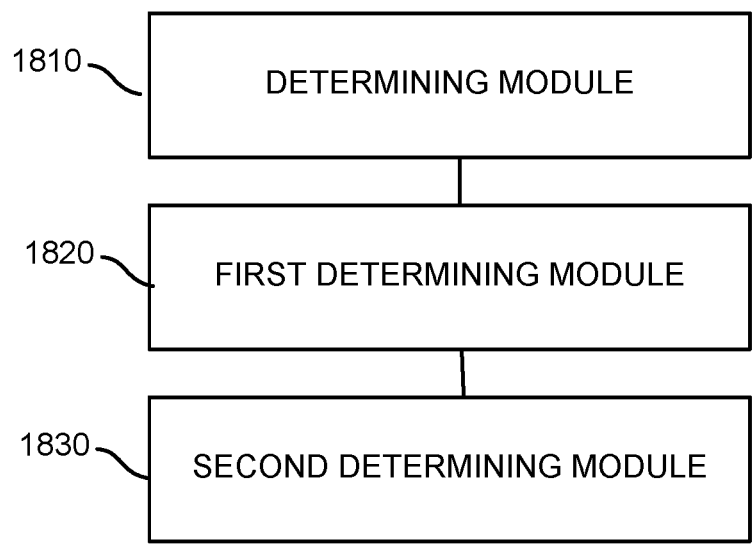
FIG. 18 is a diagram of another embodiment of a first determining subunit.

FIG. 18 is a diagram of another embodiment of a first determining subunit. In some embodiments, the first determining subunit 1800 is an implementation of the first determining subunit 1430 of FIG. 14 and comprises: a determining module 1810, a first determining module 1820, and a second determining module 1830.

In some embodiments, the determining module 1810 is configured to determine whether positional relationships satisfy a preset condition.

In some embodiments, the first determining module 1820 is configured to determine that a category associated with the first data set is a first category in the event that the positional relationships satisfy a preset condition. In some embodiments, the first category indicates that the targets in the N images corresponding to a data set belong to the same object.

In some embodiments, the second determining module 1830 is configured to determine that the category associated with the first data set is a second category in the event that the positional relationships do not satisfy a preset condition. In some embodiments, the second category indicates that the targets in the N images corresponding to a data set do not belong to the same object.

As discussed above in FIG. 14, the first determining subunit 1430 determines, based on the positional relationships between the first similarity level and similarity levels corresponding to multiple training sets in a data model, the category associated with the first data set, i.e., whether the targets in the N images corresponding to the first data set belong to the same object. In some embodiments, a determining condition is set in advance. After the positional relationships between a first similarity level and similarity levels corresponding to multiple training sets in the data model are acquired, a determination is made as to whether the positional relationships satisfy the preset determining condition.

Referring back for FIG. 18, in the event that the positional relationships satisfy the determining condition, the first determining module 1820 of FIG. 18 determines that the first data set belongs to a first category. In other words, the targets in the N images corresponding to the first data set belong to the same object. In the event that the positional relationships do not satisfy the determining condition, the second determining module 1830 determines that the first data set belongs to a second category. In other words, the targets in the N images corresponding to the first data set do not belong to the same object.

In some embodiments, the target characteristic information is extracted from each image, and a corresponding first data set is acquired. Moreover, a data model is generated by subjecting data sets including target characteristic information to training, and the category associated with the first data set is determined using the data model. The above approach determines whether targets in the N images belong to the same object. The technical result is an increase in the consistency of image determination results and thus is a reduction of poor consistency in image determination results due to manual selection of multiple determination conditions for comparing images.

Figure 19:
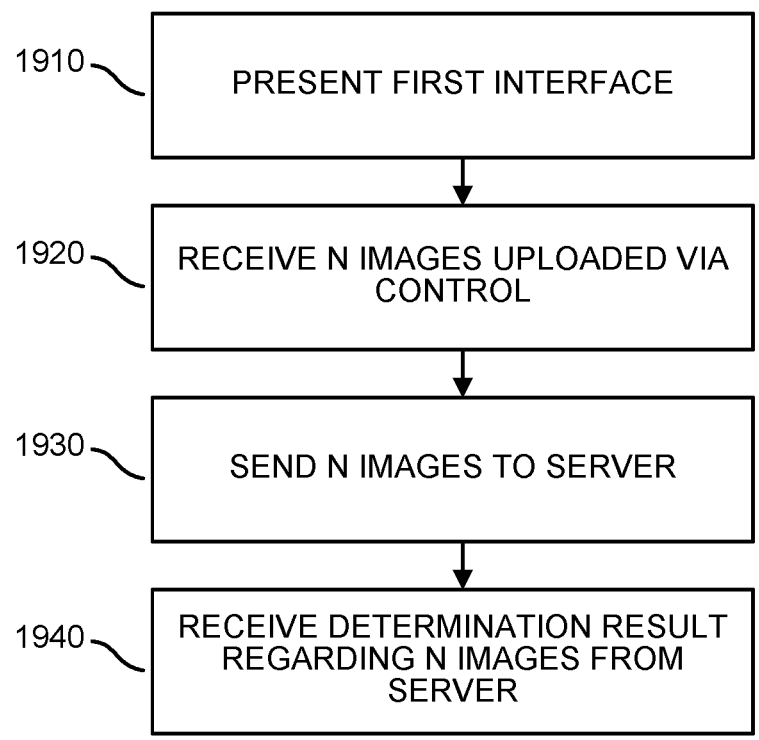
FIG. 19 is a flowchart of another embodiment of a process for image identification.

FIG. 19 is a flowchart of another embodiment of a process for image identification. In some embodiments, the process 1900 is implemented by a client 2410 of FIG. 24 and comprises:

In 1910, the client presents a first interface. In some embodiments, the first interface comprises a control for uploading images.

In 1920, the client receives N images uploaded via the control.

In 1930, the client sends the N images to a server, which makes determinations regarding the images.

In 1940, the client receives a determination result regarding the N images from the server. In some embodiments, the server determines, via a data model, the category associated with a first data set corresponding to the N images. The category can indicate whether targets in the N images corresponding to the data set belong to the same object. The data model is a model trained via multiple training sets. The multiple training sets include: data sets generated from target characteristic information in a group of images of the same object.

In some embodiments, a server produces a determination result regarding the N images and determines, using a data model, the category associated with a first data set corresponding to the N images. The above process 1900 determines whether targets in the N images belong to the same object. The technical result in an increase in the consistency of image determination results and thus a reduction in poor consistency in image determination results that is a result of manual selection of multiple determination conditions for comparing images.

Figure 20:
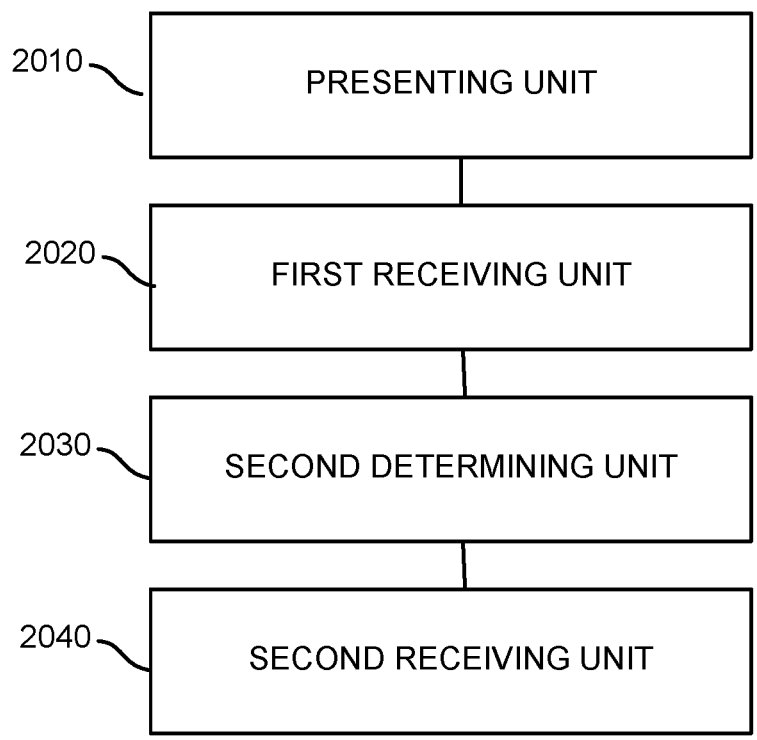
FIG. 20 is a diagram of an embodiment of a device for image identification.

FIG. 20 is a diagram of an embodiment of a device for image identification. In some embodiments, the device 2000 is configured to implement the process 1900 of FIG. 19 and comprises: a presenting unit 2010, a first receiving unit 2020, a second determining unit 2030, and a second receiving unit 2040.

In some embodiments, the presenting unit 2010 is configured to present a first interface. In some embodiments, the first interface comprises a control for uploading images.

In some embodiments, the first receiving unit 2020 is configured to receive N images uploaded via the control.

In some embodiments, the second determining unit 2030 is configured to send the N images to a server, and determine the N images via the server.

In some embodiments, the second receiving unit 2040 is configured to receive a determination result regarding the N images from the server. In some embodiments, the server determines, via a data model, the category associated with a first data set corresponding to the N images. The first data set can be a data set obtained by extracting target characteristic information from each image. The category can indicates whether targets in the N images corresponding to a data set belong to the same object. The data model is a model trained using multiple training sets. The multiple training sets include: data sets generated from target characteristic information in a group of images of the same object.

In some embodiments, a server produces a determination result regarding the N images. The server determines, using a data model, the category associated with a first data set corresponding to the N images. The device 2000 determines whether targets in the N images belong to the same object. The technical results in an increase in consistency of image determination results and a reduction in poor consistency in image determination results that is a result of manual selection of multiple determination conditions for comparing images.

Figure 21:
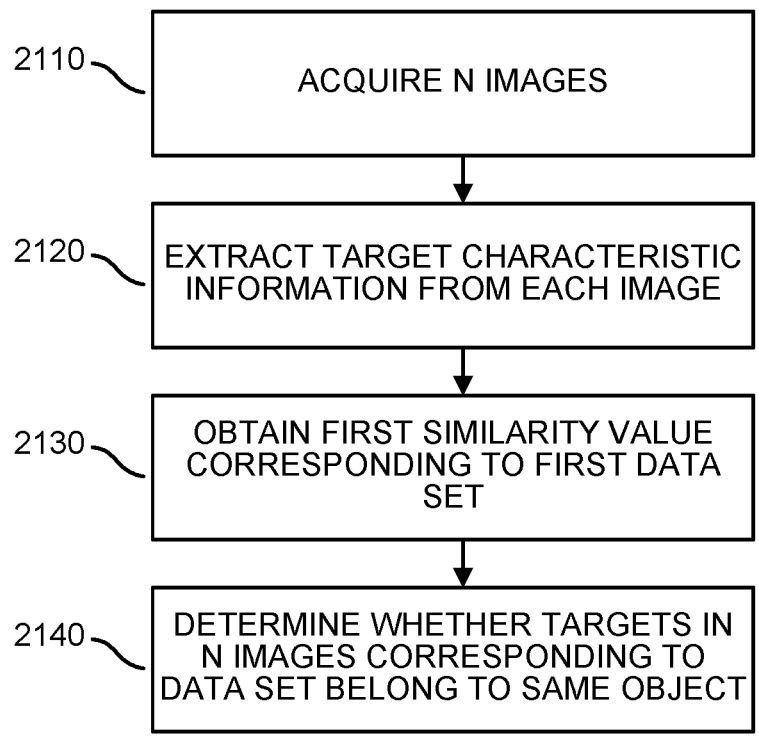
FIG. 21 is a flowchart of yet another embodiment of a process for image identification.

FIG. 21 is a flowchart of yet another embodiment of a process for image identification. In some embodiments, the process 2100 is implemented by a client 2410 of FIG. 24 and comprises:

In some embodiments, the process 2100 includes the following: N images are acquired, wherein N is a natural number greater than 1; a target (e.g., an image of a human face) is determined within each image, and a determination is made as to whether the N images belong to the same object (e.g., a natural person), and each of the N images includes a target. In the event that only one image exists, obtaining an accurate result is possible in a special case below. In some embodiments, presenting a prompt can indicate the need to upload more images for the purpose of comparison.

In 2110, the client acquires N images. In some embodiments, N is a natural number greater than 1.

In 2120, the client extracts target characteristic information from each image to obtain a first data set corresponding to the N images.

The target characteristic information included in the target in each of the N images is extracted. The extracted target characteristic information can include characteristic information used to differentiate between different targets.

In some embodiments, the target characteristic information is human or animal facial characteristic information. In some embodiments, the facial characteristic information includes: positions of facial features, shapes of facial features, ratios of facial features, or any combination thereof. The facial characteristic information can be the main features of the human face, such as the shapes, ratios, and relative positions of the eyes, eyebrows, nose, mouth, and other major features. Different human faces can be distinguished based on feature information such as the shapes, ratios, and relative positions of major features.

The result after target characteristic information is extracted from the N images is N pieces of target characteristic information corresponding to the N images. A first data set corresponding to the N images is obtained based on the extracted N pieces of target characteristic information.

In 2130, the client obtains, based on the first data set, a first similarity value corresponding to the first data set. In some embodiments, the first similarity value indicates the probability that the N images corresponding to the first data set are of the same object.

In some embodiments, the client acquires, based on the obtained first data set corresponding to N images, a first similarity value corresponding to the first data set. In some embodiments, the first similarity value indicates the probability that the N images corresponding to the first data set belong to the same object. Many techniques that can be implemented to calculate the probability that the N images corresponding to the first data set belong to the same object. For example, distance measurement (e.g., cosine distance or Euclidean distance) is used to classify the first data set corresponding to the N images, to calculate the first similarity value corresponding to the first data set, etc.

In 2140, the client determines, based on the relationship between the first similarity value and a preset threshold value, whether the targets in the N images corresponding to the data set belong to the same object.

The preset threshold value mentioned in this process can be a preset threshold value acquired through a data model. The preset threshold value can be determined based on a pre-generated data model (e.g., the nearest neighbor algorithm, abbreviated as the "KNN model"). Then the first similarity value can be compared to the preset threshold value to determine whether the targets in the N images corresponding to the data set belong to the same object.

Please note that a number of objects are selected while the data model is being generated. For each object, any image containing a target can be selected, and target characteristic information is extracted from these images to generate a data set. The data set can serve as a training set. Training is conducted using multiple training sets generated based on multiple selected objects, and ultimately the data model is generated.

In some embodiments, N images are acquired, and N is a natural number greater than 1. Target characteristic information is extracted from each image to obtain a first data set corresponding to the N images, and obtain, based on the first data set, a first similarity value corresponding to the first data set. In some embodiments, the first similarity value indicates the probability that the N images corresponding to a first data set belong to the same object. A determination is made based on the relationship between the first similarity value and a preset threshold value whether the targets in the N images corresponding to a data set belong to the same object. Process 2100 increases the consistency of image determination results and thus reduces poor consistency in image determination results that is a result of manual selection of multiple determination conditions for comparing images.

In some embodiments, to increase the accuracy of the first similarity value corresponding the first data set, the first similarity value corresponding to the first data set can be obtained based on the first data set. The process includes: conducting pairwise comparisons on target characteristic information extracted from N images to obtain $N(N-1)/2$ similarity values; associating the $N(N-1)/2$ similarity values to obtain a vector of $N(N-1)/2$ dimensions; and obtaining a first similarity value based on the vector of $N(N-1)/2$ dimensions.

In some embodiments, to increase the consistency of the determination results regarding the images, setting different weights for different dimensions and obtaining a first similarity value based on a vector of $N(N-1)/2$ dimensions are possible. This process can be further achieved by: acquiring weights corresponding to each dimension of the vector of $N(N-1)/2$ dimensions, and obtaining a first similarity value by subjecting the vector of $N(N-1)/2$ dimensions to weighted sum based on the weights corresponding to each dimension.

In some embodiments, to increase the consistency of the determination results regarding the images, different weights for different similarity values can be set and a first similarity value corresponding to the first data set can be obtained based on the first data set. This process comprises: conducting pairwise comparisons on target characteristic information extracted from N images to obtain $N(N-1)/2$ similarity values; acquiring weights corresponding to the $N(N-1)/2$ similarity values; and obtaining a first similarity value by subjecting the $N(N-1)/2$ similarity values to weighted sum based on the weights.

The accuracy of the acquired first similarity value corresponding to the first data set is increased using the above process, which further increases consistency in determining whether the targets in the N images corresponding to the data set belong to the same object based on the relationship between the first similarity value and a preset threshold value.

Figure 22:
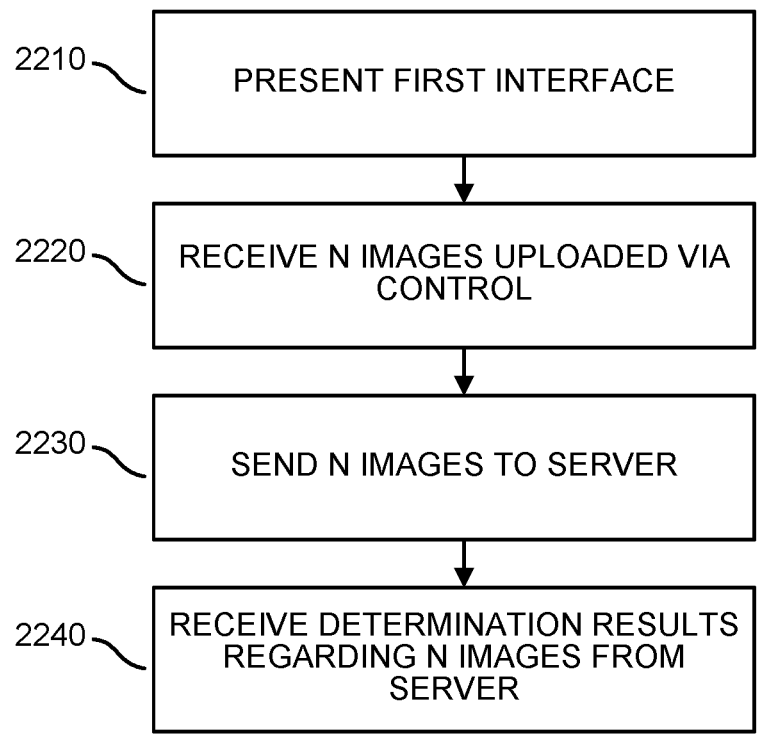
FIG. 22 is a flowchart of yet another embodiment of a process for image identification.

FIG. 22 is a flowchart of yet another embodiment of a process for image identification. In some embodiments, the process 2200 is implemented by a client 2410 of FIG. 24 and comprises:

In 2210, the client presents a first interface. In some embodiments, the first interface comprises a control for uploading images.

In 2220, the client receives N images uploaded via the control.

In 2230, the client sends the N images to a server, which makes determinations about the N images.

In 2240, the client receives the determination results regarding the N images from the server. In some embodiments, the server extracts target characteristic information from each image to obtain a first data set corresponding to N images, obtains, based on the first data, a first similarity value corresponding to the first data set, wherein the first similarity value indicates the probability that the N images corresponding to the first data set belong to the same object, and determines, based on the relationship between the first similarity value and a preset threshold value, whether the targets in the N images corresponding to the data set belong to the same object.

In some embodiments, the server produces a determination result regarding the N images. The server can extract target characteristic information from each image to obtain a first data set corresponding to the N images and obtain, based on the first data set, a first similarity value corresponding to the first data set. In some embodiments, the first similarity value indicates the probability that the N images corresponding to the first data set belong to the same object. The server can determine, based on the relationship between the first similarity value and a preset threshold value, whether the targets in the N images corresponding to the data set belong to the same object. The technical results in an increase in the consistency of image determination results and a reduction in poor consistency in image determination results that is a result of manual selection of multiple determination conditions for comparing images.

Figure 23:
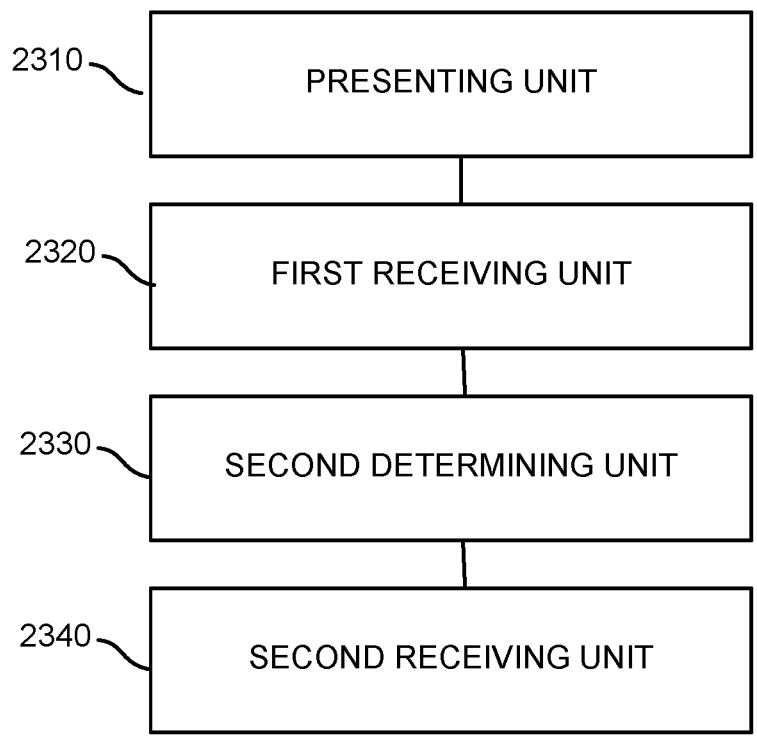
FIG. 23 is a diagram of another embodiment of a device for image identification.

FIG. 23 is a diagram of another embodiment of a device for image identification. In some embodiments, the device 2300 is configured to implement the process 1900 of FIG. 19 and comprises: a presenting unit 2310, a first receiving unit 2320, a second determining unit 2330, and a second receiving unit 2340.

In some embodiments, the presenting unit 2310 is configured to present a first interface, and the first interface comprises a control for uploading images.

In some embodiments, the first receiving unit 2320 is configured to receive N images uploaded via the control.

In some embodiments, the second determining unit 2330 is configured to send the N images to a server, and determine the N images through the server.

In some embodiments, the second receiving unit 2340 is configured to receive the determination result regarding the N images from the server. In some embodiments, the server extracts target characteristic information from each images to obtain a first data set corresponding to N images, obtains, based on the first data set, a first similarity value corresponding to the first data set, wherein the first similarity value indicates a probability that the N images corresponding to the first data set belong to the same object, and determines, based on the relationship between the first similarity value and a preset threshold value, whether the targets in the N images corresponding to a data set belong to the same object.

In some embodiments, a server produces a determination result regarding the N images. The server extracts target characteristic information from each image to obtain a first data set corresponding to the N images and obtains, based on the first data set, a first similarity value corresponding to the first data set, wherein the first similarity value indicates the probability that the N images corresponding to the first data set belong to the same object. The server determines, based on the relationship between the first similarity value and a preset threshold value, whether the targets in the N images corresponding to the data set belong to the same object. The technical result thus provides an increase in the consistency of image determination results and a reduction in poor consistency in image determination results that is a result of manual selection of multiple determination conditions for comparing images.

Figure 24:
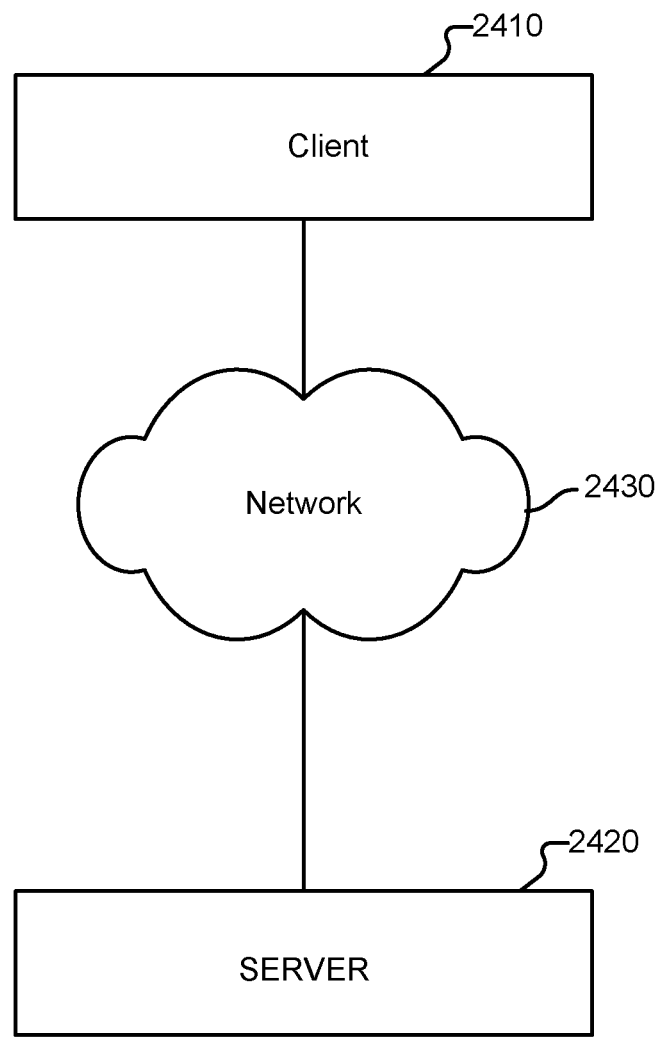
FIG. 24 is a flowchart of an embodiment of a system for image identification.

FIG. 24 is a flowchart of an embodiment of a system for image identification. In some embodiments, the system 2400 includes a client 2410 connected to a server 2420 via a network 2430.

In some embodiments, the client 2410 acquires N images, extracts target characteristic information from each image to obtain a first data set corresponding to the N images, and determines the category associated with the first data set corresponding to the N images based on a data model.

In some embodiments, the client 2410 presents a first interface, receives N images uploaded via the control, sends the N images to the server 2420, determines the N images through the server 2420, and receives the determination results regarding the N images from the server 2420.

The present application discloses a process for image identification. In some embodiments, the process includes acquiring N images, N being a natural number greater than 1, extracting target characteristic information from respective ones of the N images to obtain a first data set corresponding to the N images, obtaining, using the first data set, a first similarity value corresponding to the first data set, the first similarity value indicating a probability that the N images corresponding to the first data set are of the same object, and determining, based on a relationship between the first similarity value and a preset threshold value, whether the target characteristic information in the N images corresponding to the data set belong to the same object.

In some embodiments, the obtaining of the first similarity value corresponding to the first data set includes conducting pairwise comparisons on the target characteristic information extracted from the N images to obtain $N(N-1)/2$ similarity values, associating the $N(N-1)/2$ similarity values to obtain a vector of $N(N-1)/2$ dimensions, and obtaining the first similarity value based on the vector of $N(N-1)/2$ dimensions.

In some embodiments, the obtaining of the first similarity value based on the vector of $N(N-1)/2$ dimensions includes acquiring weights corresponding to respective dimensions of the vector of $N(N-1)/2$ dimensions, and obtaining the first similarity value by subjecting the vector of $N(N-1)/2$ dimensions to weighted sum based on the weights corresponding to the respective dimensions.

In some embodiments, the obtaining of the first similarity value based on the vector of $N(N-1)/2$ dimensions includes conducting pairwise comparisons on the target characteristic information extracted from the N images to obtain $N(N-1)/2$ similarity values, acquiring weights corresponding to the $N(N-1)/2$ similarity values, and obtaining the first similarity value by subjecting the $N(N-1)/2$ similarity values to weighted sum based on the weights.

The present application discloses a process for image identification. In some embodiments, the process includes presenting a first interface, the first interface including a control for uploading images, receiving N images uploaded via the control, sending the N images to a server, the server being configured to analyze the N images, and receiving the determination result regarding the N images from the server, the server being configured to extract target characteristic information from respective images to obtain a first data set corresponding to the N images, obtain, using the first data set, a first similarity value corresponding to the first data set, the first similarity value indicating a probability that the N images corresponding to the first data set belong to the same object, and determine, based on a relationship between the first similarity value and a preset threshold value, whether targets in the N images corresponding to the data set belong to the same object.

The present application discloses a system for image identification. In some embodiments, the system includes a processor, and a memory coupled with the processor. In some embodiments, the memory is configured to provide the processor with instructions which when executed cause the processor to present a first interface, the first interface including a control for uploading images, receive N images uploaded via the control, send the N images to a server, the server being configured to analyze the N images, and receive the determination result regarding the N images from the server. In some embodiments, the server is configured to extract target characteristic information from respective images to obtain a first data set corresponding to the N images, obtain, using the first data set, a first similarity value corresponding to the first data set, the first similarity value indicating a probability that the N images corresponding to the first data set belong to the same object, and determine, based on a relationship between the first similarity value and a preset threshold value, whether targets in the N images corresponding to the data set belong to the same object.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   acquiring N images, wherein N is a natural number greater than 1;
   extracting target characteristic information from respective ones of the N images to obtain a first data set corresponding to the N images; and
   determining, using a data model, a category associated with the first data set corresponding to the N images, wherein the category indicates whether the target characteristic information in the N images corresponding to the first data set belongs to the same object, wherein the data model is trained using multiple training sets, the multiple training sets including data sets generated from target characteristic information of a group of images of one object, and wherein the determining of the category associated with the first data sets corresponding to the N images comprises:
      obtaining, based on the first data set, a first similarity value corresponding to the first data set, wherein the first similarity value indicates a probability that the N images corresponding to the first data set are of the same object, and wherein the obtaining of the first similarity value corresponding to the first data set comprises:
         conducting pairwise comparisons on the target characteristic information extracted from the N images to obtain N(N−1)/2 similarity values;
         associating the N(N−1)/2 similarity values to obtain a vector of N(N−1)/2 dimensions; and
         obtaining the first similarity value based on the vector of N(N−1)/2 dimensions;
      acquiring positional relationships of the first similarity value in the data model, wherein the positional relationships correspond to positional relationships between the first similarity value and similarity values corresponding to the multiple training sets; and
      determining the category associated with the first data set based on the positional relationships of the first similarity value.

2. The method as described in claim 1, wherein the obtaining of the first similarity value corresponding to the first data set comprises:
   obtaining a multidimensional vector by associating the target characteristic information extracted from the N images; and
   obtaining the first similarity value based on the multidimensional vector.

3. The method as described in claim 2, wherein the obtaining of the first similarity value based on the multidimensional vector comprises:
   acquiring weights corresponding to respective dimensions of the multidimensional vector; and
   obtaining the first similarity value by subjecting the multidimensional vector to weighted sum based on the weights corresponding to the respective dimensions.

4. The method as described in claim 1, wherein the obtaining of the first similarity value based on the vector of N(N−1)/2 dimensions comprises:
   acquiring weights corresponding to respective dimensions of the vector of N(N−1)/2 dimensions; and
   obtaining the first similarity value by subjecting the vector of N(N−1)/2 dimensions to weighted sum based on the weights corresponding to the respective dimensions.

5. The method as described claim 1, wherein the multiple training sets comprise: data sets generated from target characteristic information in a group of images of objects that are not the same.

6. The method as described in claim 1, wherein the determining of the category associated with the first data set based on the positional relationships of the first similarity value comprises:
   determining whether the positional relationships of the first similarity value satisfy a preset condition;
   in response to a determination that the positional relationships of the first similarity value satisfy the preset condition, determining that the category associated with the first data set is a first category, wherein the first category indicates that the target characteristic information in the N images corresponding to the data set belong to the same object; and
   in response to a determination that the positional relationships of the first similarity value does not satisfy the preset condition, determining that the category associated with the first data set is a second category, wherein the second category indicates that the target characteristic information in the N images corresponding to the data set do not belong to the same object.

7. The method as described in claim 1, wherein:
   the target characteristic information is facial characteristic information of people or animals; and
   the facial characteristic information includes: positions of facial features, shapes of facial features, ratios of facial features, or any combination thereof.

8. The method as described in claim 1, further comprising:
   acquiring a respective data set in the training sets and classifications corresponding to the data sets;
   obtaining a function model based on the data sets in the training sets and the corresponding classifications, wherein output of the function model is correct classifications corresponding to the data sets in the event that input is the data sets of the training sets; and
   regarding the function model as the data model.

9. The method as described in claim 1, wherein the extracting of the target characteristic information from the respective ones of the N images comprises:
   determining a position of a target in a respective image;
   extracting a data set corresponding to the respective image from the position of the target in the respective image; and regarding the data set corresponding to the respective image as target characteristic information from the respective image.

10. A system, comprising:
a processor; and
a memory coupled with the processor, wherein the memory is configured to provide the processor with instructions which when executed cause the processor to:
acquire N images, wherein N is a natural number greater than 1;
extract target characteristic information from respective ones of the N images to obtain a first data set corresponding to the N images; and
determine, using a data model, a category associated with the first data set corresponding to the N images, wherein the category indicates whether the target characteristic information in the N images corresponding to the first data set belongs to the same object, wherein the data model is trained using multiple training sets, the multiple training sets including data sets generated from target characteristic information in a group of images of one object, and wherein the determining of the category associated with the first data sets corresponding to the N images comprises to:
obtain, based on the first data set, a first similarity value corresponding to the first data set, wherein the first similarity value indicates a probability that the N images corresponding to the first data set are of the same object, and wherein the obtaining of the first similarity value corresponding to the first data set comprises to:
conduct pairwise comparisons on the target characteristic information extracted from the N images to obtain $N(N-1)/2$ similarity values;
associate the $N(N-1)/2$ similarity values to obtain a vector of $N(N-1)/2$ dimensions; and
obtain the first similarity value based on the vector of $N(N-1)/2$ dimensions;
acquire positional relationships of the first similarity value in the data model, wherein the positional relationships correspond to positional relationships between the first similarity value and similarity values corresponding to the multiple training sets; and
determine the category associated with the first data set based on the positional relationships of the first similarity value.

* * * * *